US008171351B1

(12) United States Patent
Tomay et al.

(10) Patent No.: US 8,171,351 B1
(45) Date of Patent: May 1, 2012

(54) COLLECTING INFORMATION FROM USER DEVICES

(75) Inventors: Beryl Tomay, Newcastle, WA (US);
Howard S. Kapustein, Issaquah, WA (US); William D. Dozier, Issaquah, WA (US); John B. Roy, II, San Francisco, CA (US); Paul F. Ferraro, Seattle, WA (US); David Berbessou, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 243 days.

(21) Appl. No.: 12/433,753

(22) Filed: Apr. 30, 2009

Related U.S. Application Data

(60) Provisional application No. 61/145,479, filed on Jan. 16, 2009.

(51) Int. Cl.
*G06F 11/00* (2006.01)

(52) U.S. Cl. .......................................... 714/48; 714/47.1
(58) Field of Classification Search ........................ None
See application file for complete search history.

(56) References Cited

U.S. PATENT DOCUMENTS

| 5,491,791 A | * | 2/1996 | Glowny et al. | ................. 714/37 |
| 7,770,069 B2 | * | 8/2010 | Prescott et al. | ............. 714/38.11 |
| 2008/0243828 A1 | * | 10/2008 | Reztlaff et al. | ................... 707/5 |

\* cited by examiner

*Primary Examiner* — Michael Maskulinski
(74) *Attorney, Agent, or Firm* — Lee & Hayes, PLLC

(57) ABSTRACT

An information collection system may include a server and one or more user devices that are in electronic communication with each other. Information may be collected by the user devices. For example, a user device may collect information regarding an error that occurred on the device. A server may monitor the user devices and receive information reports from those devices. The server may also instruct the user devices to perform self-corrective actions based on information received from those devices.

20 Claims, 13 Drawing Sheets

COLLECTING INFORMATION FROM USER DEVICES

RELATED APPLICATIONS

This application is related to and claims priority from U.S. Provisional Patent Application Ser. No. 61/145,479 filed on Jan. 16, 2009, for COLLECTING INFORMATION FROM USER DEVICES, with inventors Beryl Tomay, Howard S. Kapustein, William D. Dozier, John B. Roy, Paul F. Ferraro and David Berbessou.

BACKGROUND

Electronic distribution of information has gained in importance with the proliferation of personal computers and has undergone a tremendous upsurge in popularity as the Internet has become widely available. With the widespread use of the Internet, it has become possible to distribute large, coherent units of information using electronic technologies.

Advances in electronic and computer-related technologies have permitted computers to be packaged into smaller and more powerful electronic devices. An electronic device may be used to receive and process information. The electronic device may provide compact storage of the information as well as ease of access to the information. For example, a single electronic device may store a large quantity of information that might be downloaded at any time via the Internet. In addition, the electronic device may be backed up, so that physical damage to the device does not necessarily correspond to a loss of the information stored on the device.

Electronic devices may experience problems from certain hardware, certain software, from data or messages on the device, etc. Sometimes a user may be aware of a problem or error, while at other times a user may be unaware of a problem. Benefits may be realized from improved systems and methods for collecting and using error information from a user device.

DETAILED DESCRIPTION

The present disclosure relates generally to an information collection system. Such a system may include a server and one or more user devices (e.g., electronic book readers) that are in electronic communication with each other. Information, such as errors that occur on a user device, may be collected. For example, a user device may unexpectedly shut down during operation. The user device may create an error report when an error occurs. The error report may include information about the error and information about the system parameters of the user device when the error occurred.

The server may monitor the user devices on a system-wide basis. For example, the server may monitor events that occur on the user devices such as user statistics and errors that have occurred on the user devices. The server may monitor events that occur on the user devices by requesting information from the user devices such as error reports. The server may also instruct the user devices to perform self-corrective actions such as fixing corrupt data files.

As used herein, the term "item" may correspond to any type of content. In one case, the item corresponds to a digital media item. The media item may include, without limitation, text content, image content, audio content, video content, hypertext protocol content, and so on, or any combination of these kinds of content. In addition, or alternatively, the item may include instruction-bearing content, such as machine-readable program code, markup language content, script content, and so forth. For instance, an item may correspond to a software upgrade or the like.

More specifically, in one case, the term "item" may refer to a specific unit of merchandisable content, such as an electronic book (referred to herein as an "eBook"), an issue of a magazine, and so on. Alternatively, an item may refer to smaller parts of a merchandisable unit, such as a chapter of a book or a song in an album. Alternatively, an item may refer to a larger compilation of component items which are related in any manner. For instance, an item may refer to multiple issues of a magazine in a particular year.

In general, the various features described in the implementations may be regarded as optional features, meaning that these features may be omitted or replaced with other features. Further, the various implementations described herein may be supplemented by adding additional features.

Figure 1:
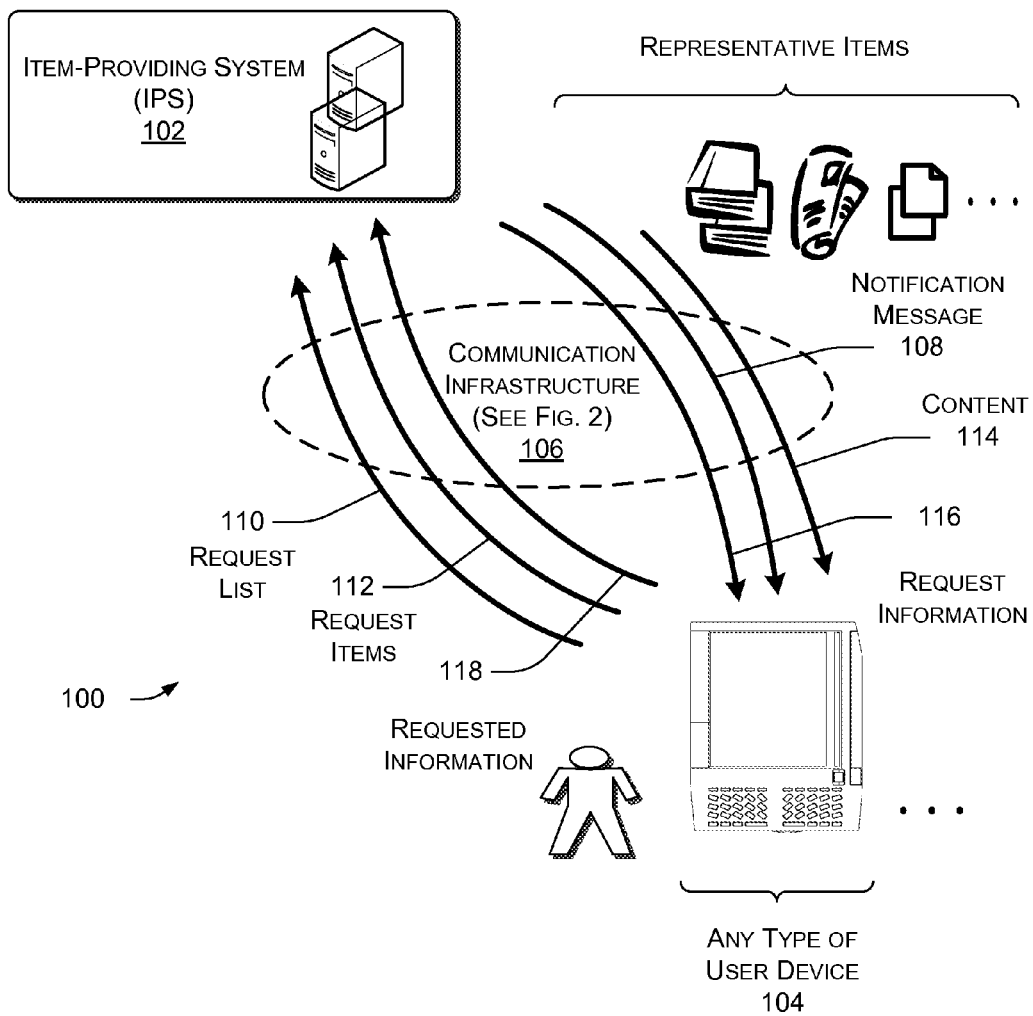
FIG. 1 is a block diagram illustrating a system for downloading items from an Item Providing System (IPS) to a user device.

FIG. 1 is a block diagram illustrating a system 100 for downloading items from an Item Providing System (IPS) 102 to a user device 104. At the device 104, the user may consume the media items in electronic form, as opposed to traditional hard-copy form. Although not shown, the user device 104 represents one of a potentially great number of user devices.

As explained above, the term "item" has broad connotation. The following list, which is non-exhaustive, identifies representative types of items.

An item may correspond to an eBook item. An eBook item, in turn, may refer to a book in electronic form or to one or more portions of a book (such as a chapter of a book) or to a compilation of multiple books (such as a book series), and so on. An eBook is an example of a general class of items referred to herein as pre-generated items. The term pre-generated item refers to content typically (although not necessarily) provided to a user in response to the user's on-demand request for the content after it has been received and stored by the IPS 102.

An item of content may also correspond to a subscription-related item. A subscription-related item refers to any item the user receives based on a schedule or based on some other type of pre-established arrangement. Without limitation, representative forms of subscription-related items include magazines, journals, newspapers, newsletters, and so on. Other forms of subscription-related items include electronic feeds of various types, such as Really Simple Syndication (RSS) feeds, and so on. In contrast to a pre-generated item, a subscription-related item is typically provided to a user in response to the receipt of the item by the IPS 102, rather than the user's on-demand request for a pre-generated item.

An item may also correspond to a personal document item, or simply "personal item." A personal item refers to a document the user forwards in advance to the IPS 102, whereupon the IPS 102 converts the item to a device-readable format.

An item may also correspond to audio content, such as a piece of music, a collection of music, an audio book, and so on. An item may also correspond to a bundle of information generated in response to a query made by the user. An item may also correspond to instruction-bearing content, such as a software update. An item may also correspond to advertising material downloaded to the user device by any entity or combination of entities. Various rules may be applied to govern the downloading of this type of item.

An item may also correspond to a sample of a more complete version of the item. In one case, a sample-type item may embed one or more links to allow the user to acquire its full-version counterpart, or another part (e.g., chapter) of the item. In another case, a publisher or author may release an eBook or other item in a series of installments. Each installment may be regarded as an item.

The item-providing system (IPS) 102 corresponds to any functionality or combination of functionality for forwarding items to the user device 104. In one case, the IPS 102 may correspond to network-accessible server-based functionality, various data stores, and/or other data processing equipment. The IPS 102 may be implemented by a single collection of functionality provided at a single physical site. Alternatively, the IPS 102 may be implemented by multiple collections of functionality, optionally provided at plural physical sites. The IPS 102 may be administered by a single entity or plural entities.

In one case, the IPS 102 corresponds to an entity that provides items to users upon the users' purchase of the items. In this role, the IPS 102 may essentially act as a bookseller or the like. In one particular commercial environment, the IPS 102 may also offer services which allow users to purchase hard-copy books for physical delivery to the users; in this context, the IPS 102 may allow users to download electronic items to respective user devices as part of its entire suite of services. In other cases, the IPS 102 corresponds to an entity which provides items to users on a non-fee basis or on the basis of some other type of alternative compensation arrangement. Thus, the term "provider" of items should be construed broadly to encompass educational institutions, governmental organizations, libraries, non-profit organizations, and so on, or some cooperative combination of any two or more entities.

The user device 104 corresponds to any type of electronic processing device 104 for receiving items from the IPS 102. In one implementation, the user device 104 is readily portable, meaning the user may freely carry the user device 104 from one location to another. In one particular case, the user device is designed as a book reader device, also known as an eBook reader device. In this case, the user device 104 functions as the electronic counterpart of a paper-based book. The user may hold the user device 104 in a manner similar to a physical book; the user may electronically turn the pages of the book, and so on.

Without limitation, FIG. 1 illustrates a particular type of eBook reader device. Additional details regarding this particular type of reader device are provided below. Alternatively, the user device 104 may correspond to any other type of portable device, such as a portable music player, a personal digital assistant (PDA), a mobile telephone, a game module, a laptop computer, and so on, or any combination of these types of devices. Alternatively, or in addition, the user device 104 may correspond to a device which is not readily portable, such as a personal computer, a set-top box associated with a television, a gaming console, and so on.

A communication infrastructure 106 bi-directionally couples the IPS 102 to the user device 104. Namely, the IPS 102 downloads items, upgrades, or other information to the user device 104 via the communication infrastructure 106. The IPS 102 receives various instructions and other data from the user device 104 via the communication infrastructure 106.

The communication infrastructure 106 may include any combination of communication functionality, including any combination of hardwired links, wireless links, etc. For instance, FIG. 2 (to be discussed below in turn) shows one implementation of the communication infrastructure 106 which includes a combination of a wide area network (WAN) and wireless infrastructure. By virtue of the wireless component of the communication infrastructure 106, the user may use the user device 104 to purchase items and consume items without being tethered to the IPS 102 via hardwired links. Thus, for instance, a user may purchase and consume an eBook using the device while riding in a car as a passenger, while hiking in a park, while boating on a lake, and so forth.

FIG. 1 shows six exchanges which describe, in very high-level form, part of a procedure for communicating with a user device 104. In a first message 108, the IPS 102 may send a notification message to the user device 104. The notification message 108 instructs the user device 104 to download one or more items from the IPS 102 and/or perform other actions. In a second message 110, the user device 104 requests the IPS 102 to supply a list which identifies one or more items to be downloaded (and any other actions to be performed, such as, in one case, sending information back to the IPS 102).

The user device 104 receives the list from the IPS 102 in response to the second message 110 (note FIG. 1 does not specifically identify the transmission of the list from the IPS 102 to the user device 104). If the instructions identify items to be downloaded, in a third message 112, the user device 104 sends a request to the IPS 102, asking the IPS 102 to provide for download of the items identified in the list. In a fourth message 114, the requested items are downloaded from the IPS 102 to the user device 104. In effect, the user device 104 retrieves the items using a pull approach, but the pull approach is initiated by a push operation (by virtue of the IPS 102 "pushing" a notification message 108 to the user device 104).

In a fifth message 116, the IPS 102 may request information from the user device 104. For example, the IPS 102 may request error and health information from the user device 104. Error and health information are discussed in more detail below in relation to FIG. 7. In a sixth message 118, the user device 104 may then provide the requested information to the IPS 102. In effect, the IPS 102 retrieves the requested information using a pull approach. Requested information may also be pushed to the IPS 102.

Figure 2:
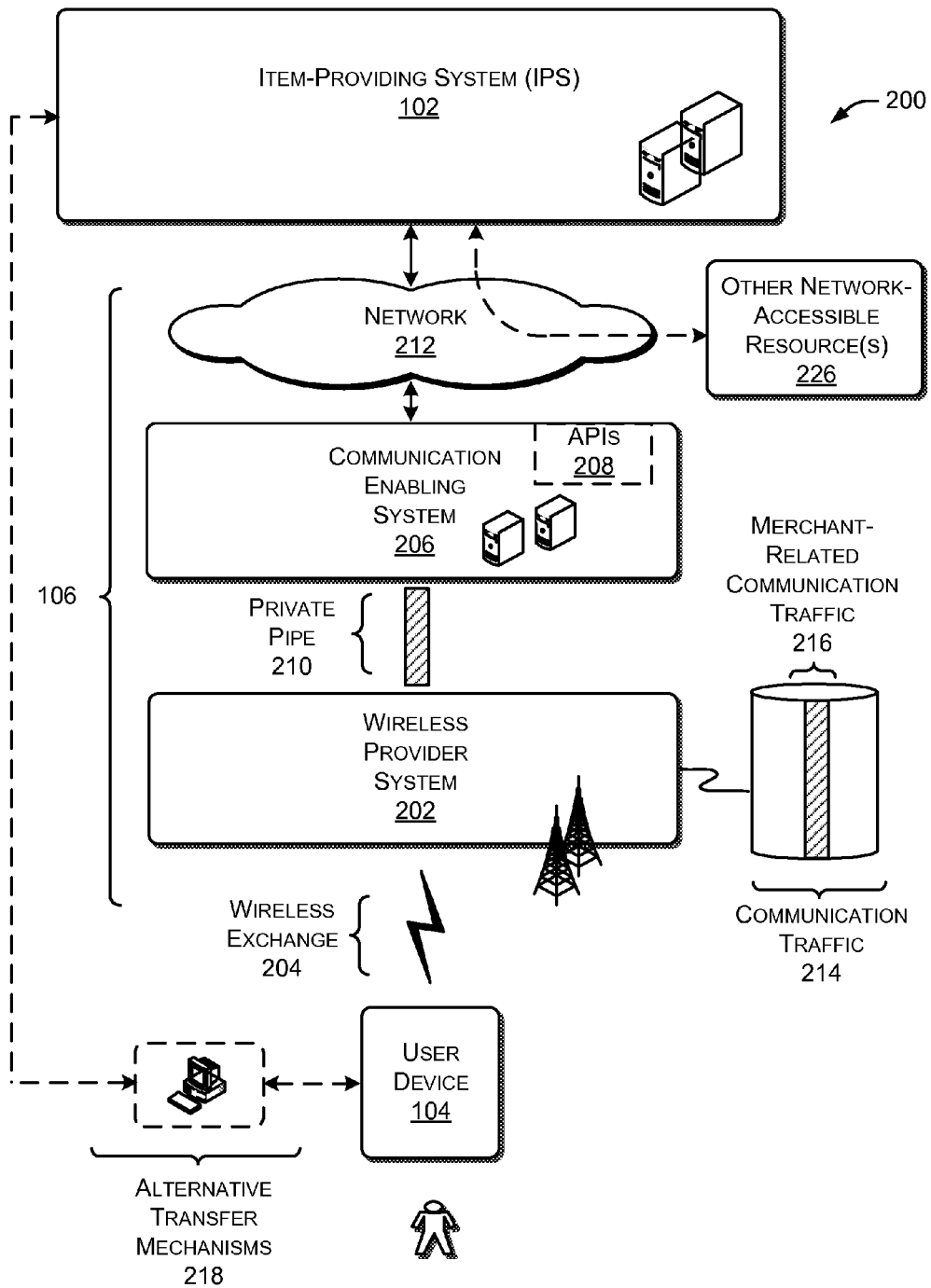
FIG. 2 shows a system which represents one illustrative implementation of the general system of FIG. 1.

FIG. 2 shows a system 200 which represents one illustrative implementation of the general system 100 of FIG. 1. By way of overview, the system 200 includes the components identified above, namely IPS 102 coupled to a user device 104 via communication infrastructure 106.

The communication infrastructure 106 may include multiple components. A first component may be a wireless provider system 202. The wireless provider system 202 corresponds to any infrastructure for providing a wireless exchange 204 with the user device 104. In one case, the wireless provider system 202 is implemented using various data processing equipment, communication towers, and so forth (not shown).

Alternatively, or in addition, the wireless provider system 202 may rely on satellite technology to exchange information with the user device 104. The wireless provider system 202 may use any form of electromagnetic energy to transfer signals, such as, without limitation, radio-wave signals. The wireless provider system 202 may use any communication technology to transfer signals, such as, without limitation, spread spectrum technology, implemented, for instance, using the Code Division Multiple Access (CDMA) protocol. The wireless provider system 202 may be administered by a single entity or by a cooperative combination of multiple entities.

The communication infrastructure 106 may also include a communication-enabling system 206. One purpose of the communication-enabling system 206 is to serve as an intermediary in passing information between the IPS 102 and the wireless provider system 202. The communication-enabling system 206 may be implemented in any manner, such as, without limitation, by one or more server-type computers, data stores, and/or other data processing equipment. The communication-enabling system 206 may include one or more application programming interfaces (APIs) 208.

The communication-enabling system 206 may communicate with the wireless provider system 202 via a dedicated channel 210, also referred to as a dedicated communication pipe or private pipe. The channel 210 is dedicated in the sense it is exclusively used to transfer information between the communication-enabling system 206 and the wireless provider system 202. In contrast, the communication-enabling system 206 communicates with the IPS 102 via a non-dedicated communication mechanism, such as a public Wide Area Network (WAN) 212. For example, the WAN 212 may represent the Internet.

The users may access the IPS 102 through alternative communication routes which bypass the wireless provider system 202. For instance, as indicated by alternative access path 218, a user may use a personal computer or the like to access the IPS 102 via the wide area network 212, circumventing the wireless provider system 202 and the communication-enabling system 206. The user may download items through this route in conventional fashion. The user may then transfer the items from the personal computer to the user device 104, e.g., via a Universal Serial Bus (USB) transfer mechanism, through the manual transfer of a portable memory device, and so on. This mode of transfer may be particularly appropriate for large files, such as audio books and the like. Transferring such a large amount of data in wireless fashion may have a relatively high cost. However, the system 200 may also be configured to transfer large files (such as audio files) via the wireless exchange 204.

Other network-accessible resources 226 may be accessed by the IPS 102 through the wide area network 212. For example, the IPS 102 may access additional databases through the wide area network 212. The wireless provider system 202 may facilitate communication traffic 214 with one or more user devices 104 and store statistics for the communication traffic 214 in a database. The wireless provider system 202 may also facilitate merchant-related communication traffic 216 with one or more merchants and store statistics for the merchant-related communication traffic 216 in a database.

Figure 3:
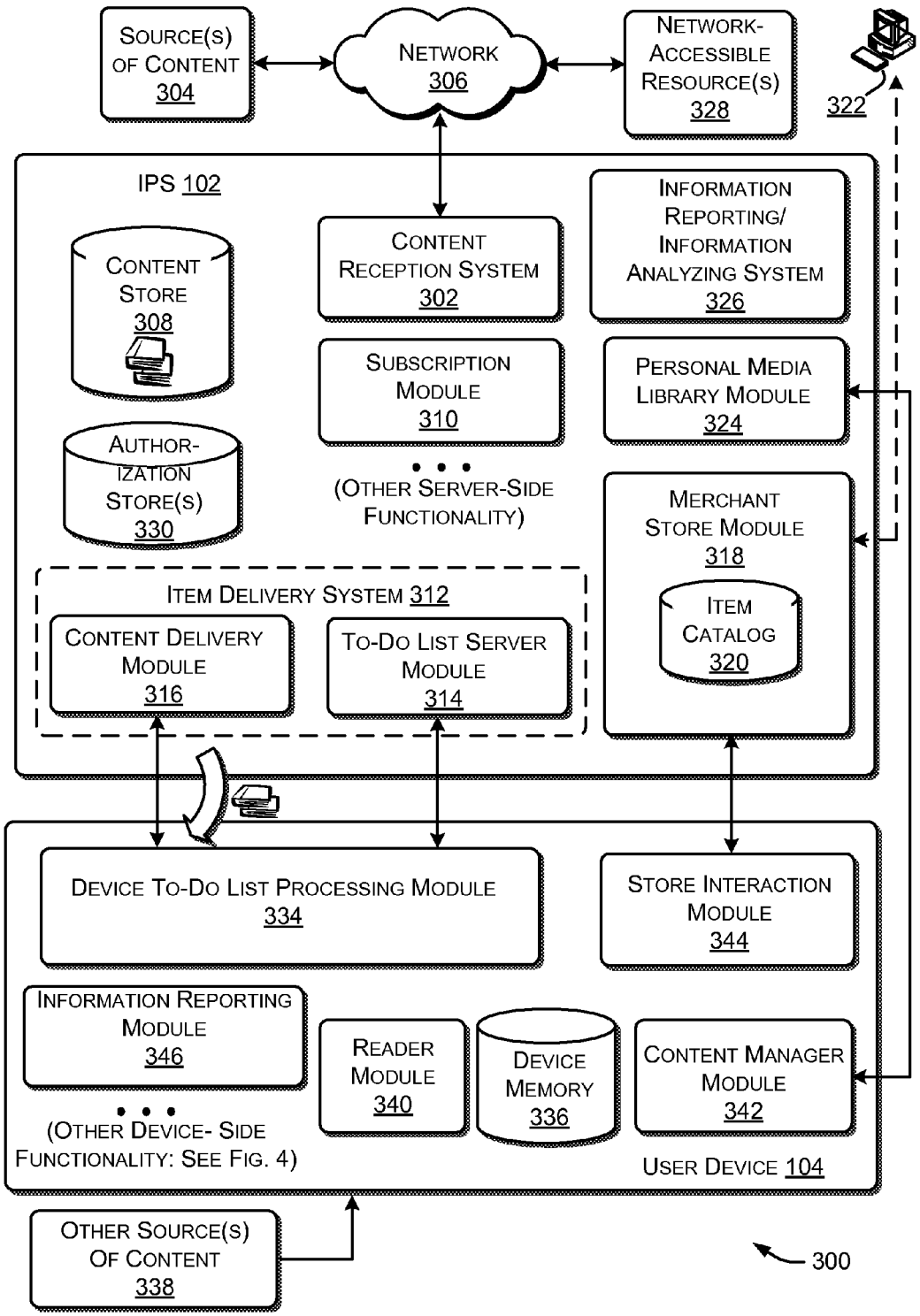
FIG. 3 shows a system including a more detailed depiction of the IPS and the user device.

FIG. 3 shows a system 300 including a more detailed depiction of the IPS 102 and the user device 104 (which were introduced in FIGS. 1 and 2). Although not shown, the system 300 shown in FIG. 3 may use the wireless features shown in FIG. 2.

In another implementation, the system 300 may use some other communication infrastructure than is shown in FIG. 2, which may optionally omit the use of wireless communication.

Addressing the details of the IPS 102 first, this system 102 performs various functions. Different modules are associated with these different functions. One module is a content reception system 302. The content reception system 302 receives content from one or more sources of content 304. The sources 304 may represent any type of provider of content, such as eBook publishers, newspaper publishers, other publishers of periodicals, various feed sources, music sources, and so on. The content reception system 302 may also access network-accessible resources 328 through the network 306, such as databases.

The sources 304 may be administered by a single entity or may be administered by separate respective entities. Further, the entity administering the IPS 102 may correspond to a same entity which administers one or more of the sources 304. Alternatively, or in addition, the entity administering the IPS 102 may interact with one or more different entities administering one or more respective sources 304. In the latter case, the entity administering the IPS 102 may enter into an agreement with the source entities to receive content from these source entities.

In the above example, the entities associated with the sources 304 may correspond to commercial organizations or other types of organizations. In another case, one or more of the sources may correspond to individual users, such as the creators of the items. For example, a user may directly provide items to the IPS 102. Alternatively, or in addition, a user may supply content to a community repository of items, and the IPS 102 may receive content from this repository, and so on.

The content reception system 302 may obtain the content through various mechanisms. In one case, the content reception system 302 obtains the content via one or more networks 306. The networks 306 may represent a WAN, such as the Internet, a Local Area Network (LAN), or some combination thereof. The content reception system 302 may receive the information in various forms using any protocol or combination of protocols. For instance, the content reception system 302 may receive the information by making a Hypertext Transfer Protocol (HTTP) request, by making a File Transfer Protocol (FTP) request, by receiving a feed (e.g., an RSS feed), and so forth.

In another case, the IPS 102 may obtain content via a peer-to-peer (P2P) network of sources 304. More generally, the content reception system 302 may proactively request the content in an on-demand manner (based on a pull method of information transfer), or the content reception system 302 may receive the content in response to independent transfer operations initiated and performed by the sources 304 (based on a push method of information transfer). Alternatively, the content reception system 302 may use a combination of pull and push transfer mechanisms to receive the content.

The content reception system 302 may receive content in the form of items. Without limitation, the items may include eBooks, audio books, music, magazine issues, journal issues, newspaper editions, various feeds, and so forth. In one case, the content reception system 302 may receive some items expressed in a format not readable by the user device 104 (where the user device may optionally be configured to receive, process, and present content expressed in one or more predefined formats). To address this situation, the content reception system 302 may convert the items from their original format into a device-readable format.

The content reception system 302 stores the items received (and optionally converts them to another format) in a content store 308. The content store 308 includes one or more storage systems for retaining items in electronic form, located at a single site or distributed over plural sites, administered by one or more entities.

The IPS 102 also includes a subscription module 310. The subscription module 310 manages users' subscriptions to subscription-related items. Generally, a subscription entitles a user to receive one or more subscription-related items (which are yet to be received and stored by the content reception system 302) based on any type of consideration or combination of considerations. Without limitation, subscription-related item types include magazines, journals, newsletters, newspapers, various feeds, and so forth. Users may arrange to receive subscription-related items by purchasing such subscriptions, or, more generally, by registering to receive such subscriptions (which, in some cases, may not involve the payment of a fee).

Alternatively, or in addition, the IPS 102 may automatically register users to receive subscription-related items without the involvement of the users (and possibly without the approval of the users). The latter scenario may be appropriate in the case in which the IPS 102 (or some other entity) registers a user to receive unsolicited advertisements, newsletters, and so on. The system 300 may allow the user to opt out of receiving such unsolicited information.

The IPS 102 may consult the subscription module 310 to determine which user devices should receive a newly-received subscription-related item. For instance, upon receiving an electronic issue of the magazine Forbes, the IPS 102 consults the subscription module 310 to determine the users who have paid to receive this magazine. The IPS 102 then sends the issue to the appropriate user devices.

An item delivery system 312 represents the functionality which actually performs the transfer of content to the user device 104. In one illustrative representation, the item-delivery system 312 includes two components: a to-do list server module 314 and a content delivery module 316. The to-do list server module 314 generally provides instructions for the user device 104. The instructions direct the user device 104 to retrieve items and perform other operations. The content delivery module 316 allows the user device 104 to obtain the items identified in the instructions received from the to-do list server module 314.

More specifically, in a first phase of information retrieval, the to-do list server module 314 sends a notification message to the user device 104. The user device 104 responds to the notification message by waking up (if "asleep"), which may involve switching from a first power state to a second power state (where the second power state consumes more power than the first power state).

The user device 104 may then contact the to-do list server module 314 to request instructions from the to-do list server module 314. More specifically, for each user device, the to-do list server module 314 maintains a list of entries, also referred to herein as a "to-do queue." An entry provides an instruction for a user device to perform an action. As will be described in greater detail below, there are different instructions that a device may be directed to perform, wherein a collection of instructions defines an IPS-device interaction protocol. One such action (e.g., associated with a GET instruction of the protocol) directs the user device 104 to retrieve an item from a specified location by specifying an appropriate network address (e.g., a URL) and appropriate arguments.

In a first phase of the downloading procedure, the user device 104 may retrieve n such entries, wherein n is an integer. In one scenario, the number n may be a subset of a total number of items in the to-do queue associated with the user device 104. In a second phase of the downloading procedure, the user device 104 may contact the content delivery module 316 to retrieve one or more items identified in the GET-related entries.

In general, after receiving the notification message, the item delivery system 312 may interact with the user device 104 in a data mode, e.g., using the Hypertext Transfer Protocol (HTTP), or some other protocol or combination of protocols.

The IPS 102 may also include a merchant store module 318. The merchant store module 318 may provide access to an item catalog 320, which, in turn, may provide information regarding a plurality of items (such as eBooks, audio books, subscription related items, and so on). As will be described in greater detail below, the merchant store module 318 may include functionality allowing a user to search and browse though the item catalog 320. The merchant store module 318 may also include functionality allowing a user to purchase items (or, more generally, acquire items based on any terms).

In one case, a user may interact with the merchant store module 318 via the user device 104 using wireless communication. Alternatively, or in addition, the user may interact with the merchant store module 318 via another type of device 322, such as a personal computer, optionally via wired links. In either case, when the user purchases or otherwise acquires an item via the merchant store module 318, the IPS 102 may invoke the item delivery system 312 to deliver the item to the user.

The IPS 102 may also include a personal media library module 324. The personal media library module 324 may store, for each user, a list of the user's prior purchases. More specifically, in one case, the personal media library module 324 may provide metadata information regarding eBook items and other on-demand selections (e.g., "a la carte" selections, such as subscription issues, etc.) which a user already owns. The personal media library module 324 may also provide links to the items in the content store 308. As will be described in greater detail below, to download an eBook item (or the like) which the user has already purchased, the user device 104 contacts the content delivery module 316.

The content delivery module 316 may interact with permission information and linking information in the personal media library module 324 in order to download the item to the user. In one use scenario, the user device 104 may access the content delivery module 316 in this manner to initiate downloading of an item which has been previously purchased by the user but has been deleted by the user device 104 for any reason.

The IPS 102 may also include an information reporting/information analyzing system 326. The information reporting/information analyzing system 326 may request error information from the user device 104 including information related to the health and status of the user device 104. For example, the information reporting/information analyzing system 326 may send error configuration messages to the user devices 104 which configure the user devices 104 to produce error reports and send the error reports to the IPS 102. The information reporting/information analyzing system 326 may also process and analyze the error reports received from the user device 104. The information reporting/information analyzing system 326 is discussed in more detail below.

The IPS 102 may also include various security-related features, such as one or more authorization stores 330. The authorization stores 330 may provide information which enables various components of the IPS 102 to determine whether to allow the user to perform various functions, such as access the merchant store module 318, download items, change settings, and so on.

The above-enumerated list of modules is representative and is not exhaustive of the types of functions performed by the IPS 102. As indicated by the label "Other Server-Side Functionality," the IPS 102 may include additional functions, many of which are described below.

Now turning to the device-side features of the system 300, the user device 104 may include a device to-do list processing module 334. The purpose of the device to do list processing module 334 may be to interact with the item delivery system 312 to download items from the item delivery system 312. Namely, in a first phase of the downloading procedure, the device to-do list processing module 334 may first receive a notification message from the to-do list server module 314, which prompts it to wake up (if "asleep") and contact the to-do list server module 314 to retrieve a set of n entries.

Each entry may include an instruction which directs the device to-do list processing module 334 to perform an action. In a second phase, for a GET-type entry, the device to-do list processing module 334 may contact the content delivery module 316 to request and retrieve an item identified by the GET-type entry. As will be described in greater detail below, the user device 104 may signal a successful completion of the download process or a failure in the download process.

Upon downloading an item, the user device 104 may store the item in a device side memory 336, which in one example is a flash-type memory and may be any other type of memory in other examples. Although not shown, the user device 104 may also exchange information with any other source of content 338. In one illustrative case, the other source of content 338 may represent a personal computer or other data processing device. Such other source of content 338 may transfer an item to the user device 104 via a Universal Serial Bus (USB) connection and/or any other type(s) of connection(s). In this scenario, the other source of content 338, in turn, may receive the item from the IPS 102 (or other source) via hardwired connection (e.g., non-wireless connection). For example, to receive an audio book, the user may use a personal computer to non-wirelessly download the audio book from a network-accessible source of such content. The user may then transfer the audio book to the user device 104 via USB connection. In another illustrative case, the other source of content 338 may represent a portable memory module of any type, such as a flash type memory module, a magnetic memory module, an optical memory module, and so on.

The user device 104 may also include a reader module 340. The illustrative purpose of the reader module 340 is to present media items for consumption by the user using the user device 104. For example, the reader module 340 may be used to display an eBook to the user to provide a user experience which simulates the reading of a paper-based physical book.

The user device 104 may also include a content manager module 342. The purpose of the content manager module 342 is to allow the user to manage items available for consumption using the user device 104. For example, the content manager module 342 may allow the user to view a list of items available for consumption.

The content manager module 342 may also identify the sources of respective items: one such source corresponds to the device memory 336; another source corresponds to an attached portable memory (e.g., represented by the other source 338); another source corresponds to items identified in the personal media library module 324 (as may be revealed, in turn, by device-side metadata provided by the IPS 102); another source corresponds to subscription-related items identified by the subscription module 310, and so on. The content manager module 342 may allow the user to filter and sort the items in various ways. For example, the user may selectively view items which originate from the device memory 336.

The user device 104 may also include a store interaction module 344. The store interaction module 344 may allow the user device 104 to interact with the merchant store module 318. The user may engage the store interaction module 344 to search and browse through items, to purchase items, to read and author customer reviews, and so on. As described above, the user may also use a personal computer or the like to interact with the merchant store module 318 via hardwired links.

The user device 104 may also include an information reporting module 446. The information reporting module 446 may communicate information from the user device 104 to the IPS 102. For example, the information reporting module 446 may communicate error information from the user device 104 to the IPS 102. The information reporting module 446 may receive configuration messages from the information reporting/information analyzing system 326 of the IPS 102. For example, the information reporting module 446 may receive error configuration messages from the information reporting/information analyzing system 326 of the IPS 102. The configuration messages may instruct the information reporting module 446 to collect, store, or send information. For example, the configuration messages may instruct the information reporting module 446 to collect, store, or send error information. The information reporting module 446 may collect and store information pertaining to the user device 104, such as error information. The information reporting module 446 may collect information such as error information upon receiving an information configuration message from the information reporting/information analyzing system 326. Alternatively, the information reporting module 446 may periodically collect information. Alternatively still, the information reporting module 446 may only collect information when an event occurs on the user device 104.

The information reporting module 446 may then send the information collected to the information reporting/information analyzing system 326 of the IPS 102 in an information report. The information reporting module 446 may send the information report to the information reporting/information analyzing system 326 upon receiving an error configuration message from the information reporting/information analyzing system 326. Alternatively, the information reporting module 446 may periodically send an information report to the information reporting/information analyzing system 326 of the IPS 102. Alternatively still, the information reporting module 446 may send an information report to the information reporting/information analyzing system 326 of the IPS 102 after an event has occurred on the user device 104. The information reporting module 446 is discussed in more detail below.

The data received in an information report may be used by the IPS 102 to track and fix errors occurring on the user device 104. The data received in an information report may also be used by the IPS 102 for a variety of reasons including, but not limited to, bandwidth reports, determining the impact of radio usage on the battery, annotation synchronization usage, and the impact on the battery by contacting a user device 104.

Figure 4:
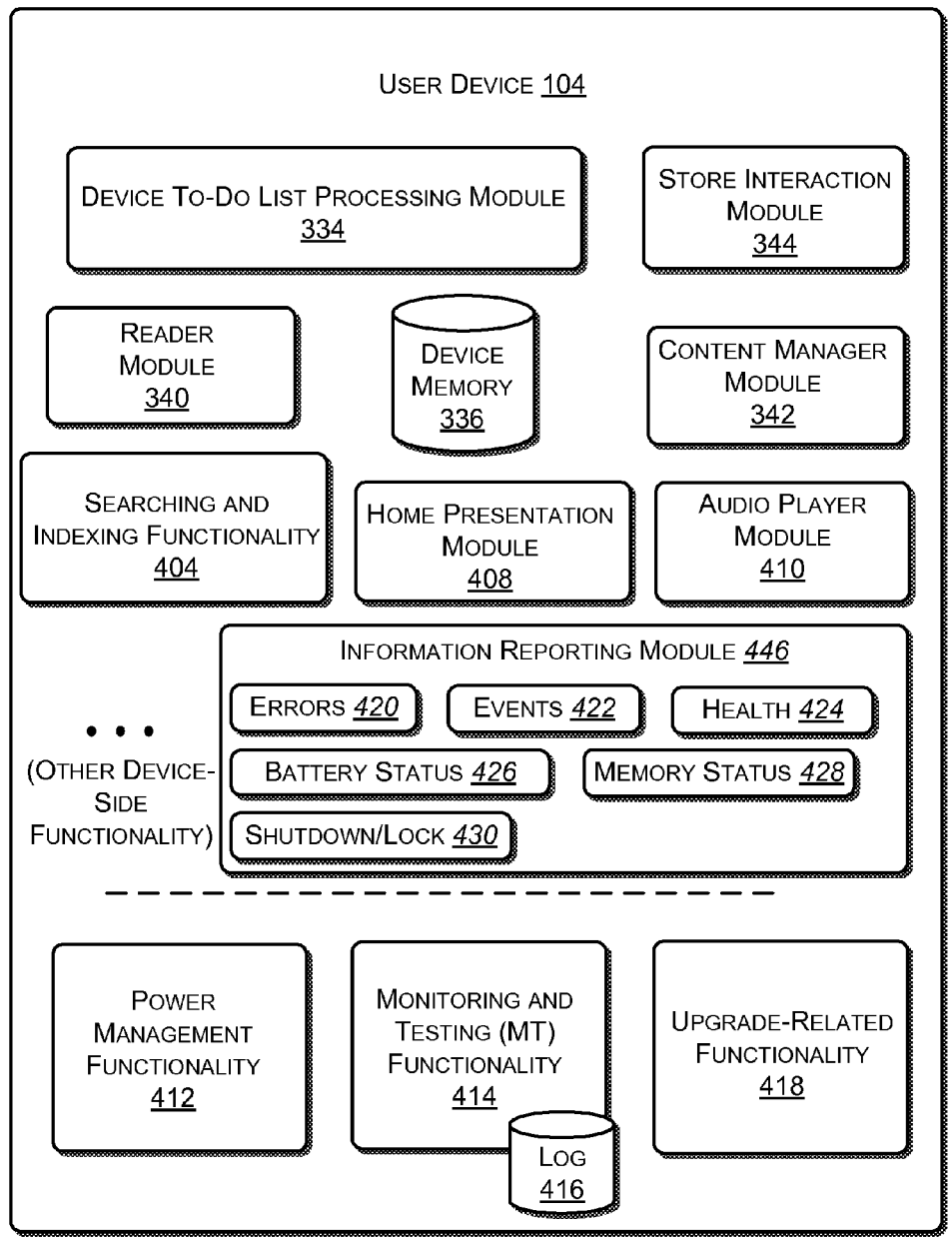
FIG. 4 shows one configuration of the user device.

The above-enumerated list of modules is representative and is not exhaustive of the types of functions performed by the user device 104. As indicated by the label "Other Device-Side Functionality," the user device 104 may include additional functions, many of which are described below. In fact, FIG. 4 shows additional device-side functionality. For completeness, FIG. 4 also identifies the various modules described above, including the device to-do list processing module 334, the device memory 336, the reader module 340, the content manager module 342, the store interaction module 344, and the information reporting module 446. These features perform the functions described above.

FIG. 4 shows one configuration of the user device 104. The user device 104 may include searching and indexing functionality 404. The indexing aspect of this functionality 404 provides a mechanism for indexing an item received from the IPS 102 and/or for interacting with an index generated and supplied by the IPS 102 or by some other source. An index for a particular item (such as an eBook or newspaper edition) identifies the component parts (e.g., words) in the item, linking the component parts to their respective locations in the item. The searching aspect of the functionality 404 provides a mechanism for searching for identified components (e.g., words, phrases, etc.) in an item, and for performing other search-related functions. The searching aspect relies on the indexing aspect.

The user device 104 may also include a home presentation module 408. The home presentation module 408 may provide a home page when the user first turns on the user device 104 and/or at other junctures. The home page may act as a general portal allowing a user to access media items and various features provided by the user device 104. In one illustrative case, the home page may present a summary of some (or all) of the items available for consumption using the user device 104.

The user device 104 may also include an audio player module 410. The audio player module 410 may provide an interface which allows the user to play back and interact with audio items, such as music, audio books and the like.

As discussed above in relation to FIG. 3, the information reporting module 446 may receive configuration messages from the IPS 102 and may collect, store, and send information pertaining to the user device 104. The information reporting module 446 may include error information such as a list of errors 420 that the user device 104 has encountered or is currently encountering. The information reporting module 446 may also include other types of information such as events 422 pertaining to the user device 104. As another example, the information reporting module 446 may include a listing of the current event 422 on the user device 104 such as the user device 104 downloading an item, the user device 104 running diagnostic software, or the like.

The information reporting module 446 may also include information such as the health 424 of the user device 104. The health 424 of the user device 104 may be an overall indicator of the health 424 of the user device 104. For example, the health 424 of the user device may include usage statistics of the user device 104, the rate of errors of the user device 104, present and past errors that the user device 104 has encountered, etc.

As another example, the information reporting module 446 may include information concerning the current (and prior) battery status 426 of the user device 104. The information reporting module 446 may also include information concerning the current (and prior) memory status 428 of the user device 104. The memory status 428 of the user device 104 may include information about the total memory on the user device 104 or the percentage of memory used to store eBooks on the user device 104. Alternatively, the memory status 428 of the user device 104 may include information about the usage of temporary storage locations such as random access memory (RAM) by the user device 104.

The information reporting module 446 may also allow the IPS 102 to access and/or gain control of the user device 104. For example, the IPS 102 may access the user device 104 to shutdown and/or lock 430 the user device 104. The IPS 102 may shutdown/lock 430 the user device 104 if, for example, the user device 104 is causing errors at the IPS 102, or if the device 104 has been reported stolen and the owner of the user device 104 wishes to prevent it 104 from being used to purchase/download additional items to the user device 104. Alternatively, the IPS 102 may shutdown/lock 430 the user device 104 to disable features on the user device 104 that are no longer necessary or available to the user.

The IPS 102 may also access the user device 104 to perform debugging operations. For example, the IPS 102 may gain control of the user device 104 to fix errors on the user device 104 and prevent future errors. The IPS 102 may perform additional debugging operations such as applying software patches, deleting unnecessary software, initiating a reboot of the user device 104, etc.

The above-described features of the user device 104 may pertain to applications with which the user may interact or which otherwise play a high-level role in the user's interaction with the user device 104. The user device 104 may include a number of other features to perform various lower-level tasks, possibly as background-type operations.

Power management functionality 412 performs one such background-type operation. More specifically, the power management functionality 412 corresponds to a collection of hardware and/or software features operating to manage the power consumed by the user device 104. The power management functionality 412 generally operates to reduce the power consumed by the device 104. The power management functionality 412 achieves this goal by selectively powering down features not actively being used (or for which there is an assumption these features are not actively being used). The power management functionality 412 achieves particularly noteworthy power savings by powering down features which make large power demands, such as one or more features associated with wireless communication.

The user device 104 may also include performance Monitoring and Testing (MT) functionality 414. The MT functionality 414 maintains a performance log 416 identifying the behavior of the device 104. The IPS 102 and/or other entities may access the performance log 416, along with other information gleaned from the communication infrastructure 106, to help diagnose anomalies in the operation of the user device 104 and the system 300 as a whole. The MT functionality 414 may also interact with testing functionality provided by the IPS 102 and/or other entities. For example, the MT functionality 414 may respond to test probes generated by the IPS 102. The MT functionality 414 may be used by the information reporting module 446 to collect information for the user device 104. For example, the performance log 416 may collect and store error information.

The user device 104 may also include an upgrade-related functionality 418. The upgrade-related functionality 418 allows the user device 104 to receive and integrate instruction-bearing update items (such as software updates). In one case, the upgrade-related functionality 418 may automatically receive instruction-bearing items provided by the IPS 102 (and/or by other entities). An administrator at the IPS 102 may manually initiate the upgrade procedure by which an instruction-bearing update item is forwarded to the user device 104. Or an automated IPS-side routine may initiate the upgrade procedure. In any event, the user device 104 may receive the instruction-bearing update item without the involvement of the user or with minimal involvement from the user. In this sense, the upgrade procedure may be viewed as "transparent." In another case, the upgrade-related functionality 418 may be operated by the user to manually access a source of instruction-bearing items (such as a prescribed website or the like) and download an item from this source.

To repeat, the above-enumerated list of modules is representative and is not exhaustive of the types of functions performed by the user device 104. As indicated by the label "Other Device-Side Functionality," the user device 104 may include additional functions.

The IPS 102 described above may interact with any type of user device 104. In one case, the user device 104 is a portable-type device, meaning a device designed to be readily carried from location to location. In one specific case, the user device 104 allows the user to consume the media items while holding the user device 104, e.g., in a manner which simulates the way a user might hold a physical book. A portable user device 104 may take the form of an eBook reader device, a portable music player, a personal digital assistant, a mobile telephone, a game module, a laptop computer, and so forth, and/or any combination of these types of devices. Alternatively, or in addition, the user device 104 may correspond to a device not readily portable, such as a personal computer, set-top box associated with a television, gaming console, and so on.

Figure 5:
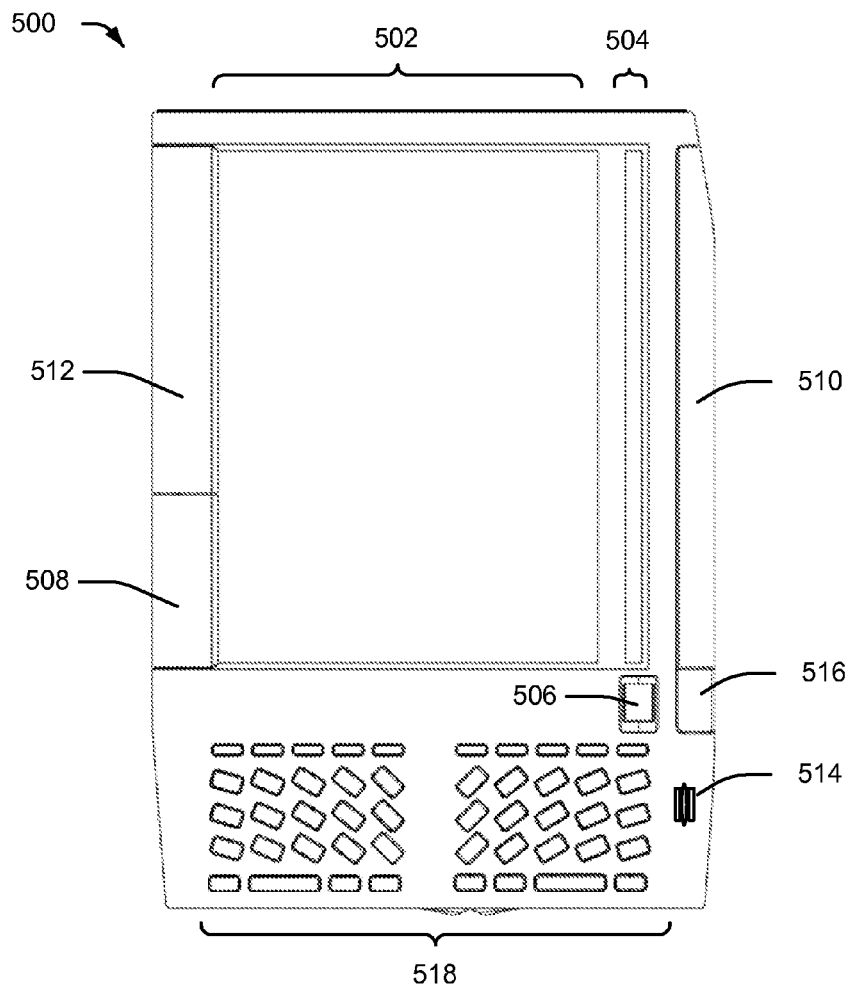
FIG. 5 shows one type of user device which may be used to interact with the IPS.

Without limitation, FIG. 5 shows one type of user device 500 which may be used to interact with the IPS 102. The user device 500 may include a wedge-shaped body designed to fit easily in the hands of a user, generally having the size of a paperback book. Other user devices may adopt different shapes and sizes.

In one representative design, the user device 500 includes two display parts: a main display part 502 and a supplemental display part 504. The main display part 502 presents various pages provided by the store interaction module 344, the reader module 340, and so on. In one case, the supplemental display part 504 is used to present a cursor. The user may position the cursor to identify laterally adjacent portions in the main display part 502. Without limitation, in one illustrative case, the main display part 502 and/or the supplemental display part 504 may be implemented using electronic paper technology, such as provided by E Ink Corporation of Cambridge, Mass. This technology presents information using a non-volatile mechanism; using this technology, the user device 500 may retain information on its display even when the device is powered off.

The user device 500 includes various input keys and mechanisms. A cursor-movement mechanism 506 allows a user to move a cursor within the supplemental display part 504. In one representative case, the cursor-movement mechanism 506 may include a cursor wheel that may be rotated to move a cursor up and down within the supplemental display part 504. The cursor-movement mechanism 506 may be configured to allow the user to make a selection by pressing down the wheel. Other types of selection mechanisms may be used, such as a touch-sensitive display, a series of vertically and/or horizontally arrayed keys along the edge(s) of the main display part 502, one or more graphical scroll bar(s) in the main display part 502, and so on.

The user device 500 also includes various page-turning buttons, such as next page buttons (508, 510) and a previous page button 512. The next page buttons (508, 510) advance the user to a next page in an item (relative to a page that is currently being displayed). The previous page 512 button advances the user to a previous page in an item (relative to a page that is currently being displayed). The user device 500 may also include a page-turning input mechanism 514 actuated by the user's thumb as it passes over the mechanism 514. This user experience simulates the manner in which a user turns a page in a physical book (e.g., by "thumbing through" a book). The user device 500 may also include a back button 516 allowing the user to advance to a previous page when using the browsing module 402. Although not shown, the user device 500 may include a switch for turning power on and off, a switch for enabling and disabling a wireless interface, and so on. The user device 500 may also include a keyboard 518. The keyboard 518 may include alphanumeric keys. The keys may be shaped and oriented in a manner which facilitates the user's interaction with the keys while the user holds the device 104 in the manner of a physical book. The user may use the keyboard 518 to enter search terms, annotations, URLs, and so forth. The keyboard 518 may also include various special-function keys.

Figure 6:
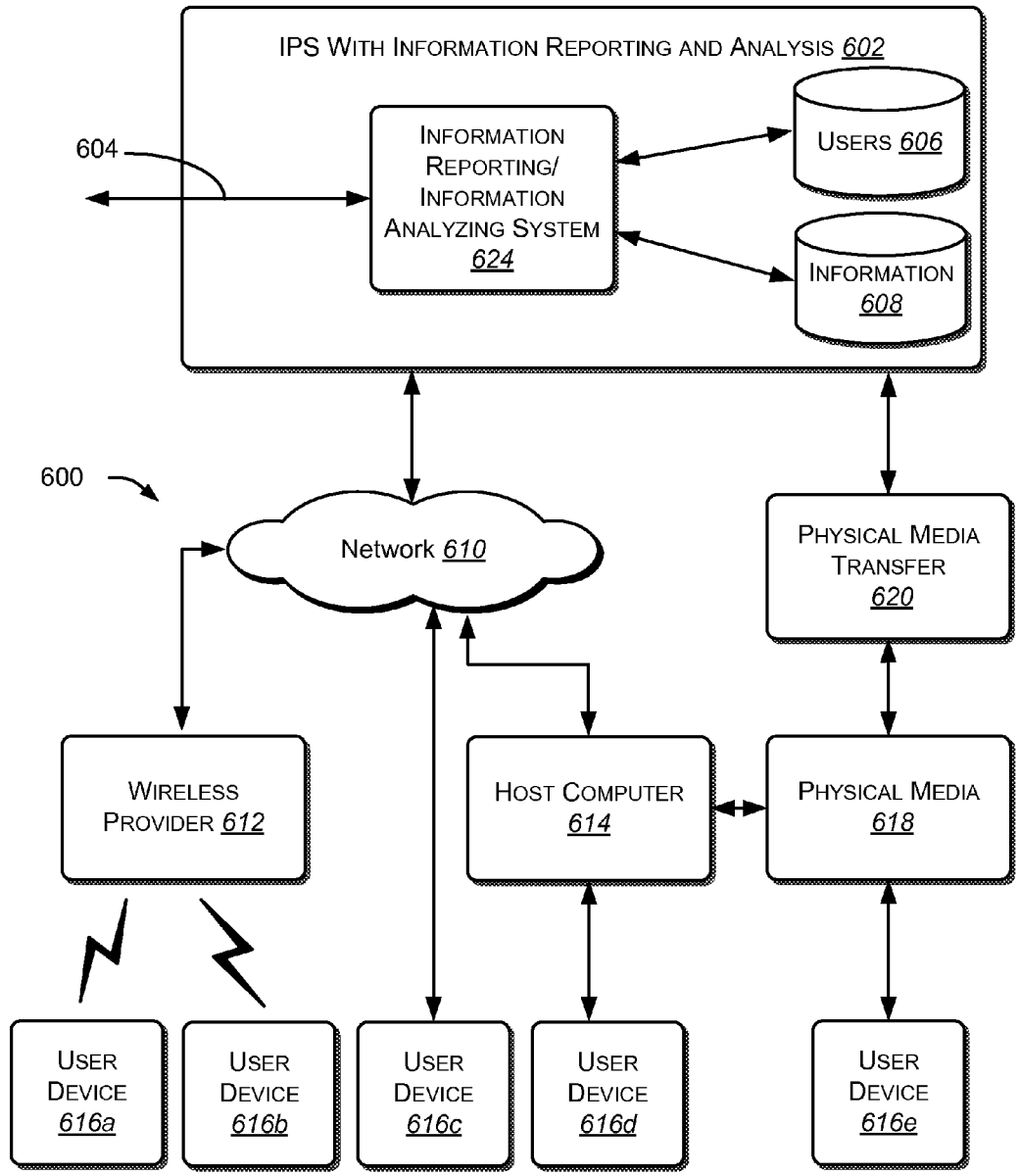
FIG. 6 shows a system including an IPS with information reporting and analysis and multiple user devices in electronic communication with the IPS.

FIG. 6 shows a system 600 including an IPS 602 with information reporting and analysis and multiple user devices 616 in electronic communication with the IPS 602. The IPS 602 may include an information reporting/information analyzing system 624. The information reporting/information analyzing system 624 has been discussed above in relation to FIG. 3 and is discussed in more detail below in relation to FIG. 7.

The IPS 602 may include one or more databases. For example, the IPS 602 may include a database of users 606. The database of users 606 may include information about each of the user devices 616 that are in electronic communication with the IPS 602. Alternatively, the database of users 606 may include information about each of the user devices 616 that are authorized to communicate with the IPS 602. Alternatively still, the database of users 606 may include information about each of the user devices 616 that have previously reported information to the IPS 602. The IPS 602 may also include an information database 608. The information database 608 may include the information received pertaining to each user device 616. For example, the information database 608 may include the errors that user devices 616 have encountered. The information database 608 may also include solutions to errors that user devices 616 have encountered. In addition, the information database 608 may include a listing of errors that do not yet have prescribed solutions.

The information reporting/information analyzing system 624 may communicate with the databases included on the IPS 602. For example, the information reporting/information analyzing system 624 may access the database of users 606 or the information database 608 to determine which user devices 616 are to be monitored and/or to determine which user devices 616 are to be sent configuration messages.

The IPS 602 may provide outside access 604 to the information reporting/information analyzing system 624. For example, a creator or distributor of a digital item may access 604 the information reporting/information analyzing system 624 from outside the IPS 602 to determine the cause of reported errors. Customer support may also access 604 the information reporting/information analyzing system 624 from outside the IPS 602 when helping users with problems they may be having on user devices 616.

The system 600 may include one or more user devices 616 that are in electronic communication with the IPS 602 through a network 610. For example, user devices 616a and 616b may communicate wirelessly with a wireless provider 612. The wireless provider 612 may then communicate with the IPS 602 through the network 610. A user device 616c may also communicate with the IPS 602 through the network 610 without intermediary modules or devices. A user device 616c may communicate with the network 610 using wired or wireless means. A user device 616d may also communicate with a host computer 614. The user device 616d may communicate with a host computer 614 using wired or wireless means. The host computer 614 may then communicate with the IPS 602 through the network 610.

Alternatively, the host computer 614 may bypass the network 610 when communicating with the IPS 602. Instead, the host computer 614 may copy information received from a user device 616d to a physical media 618. Physical media 618 may include a CD-ROM, a USB flash card, Isonlinear data crystals, etc. The physical media 618 may then be transferred to the IPS 602 in person or by a carrier as a physical media transfer 620. Likewise, the host computer 614 may receive information from the IPS 602 over a physical media 618 transferred by a physical media transfer 620.

A user device 616e may bypass both the network 610 and the host computer 614 when communicating with the IPS 602. The user device 616e may copy information to a physical media 618 and the physical media may be transferred to the IPS 602 using a physical media transfer 620. The user device 616e may also receive information from the IPS 602 over a physical media 618 transferred by a physical media transfer 620.

Figure 7:
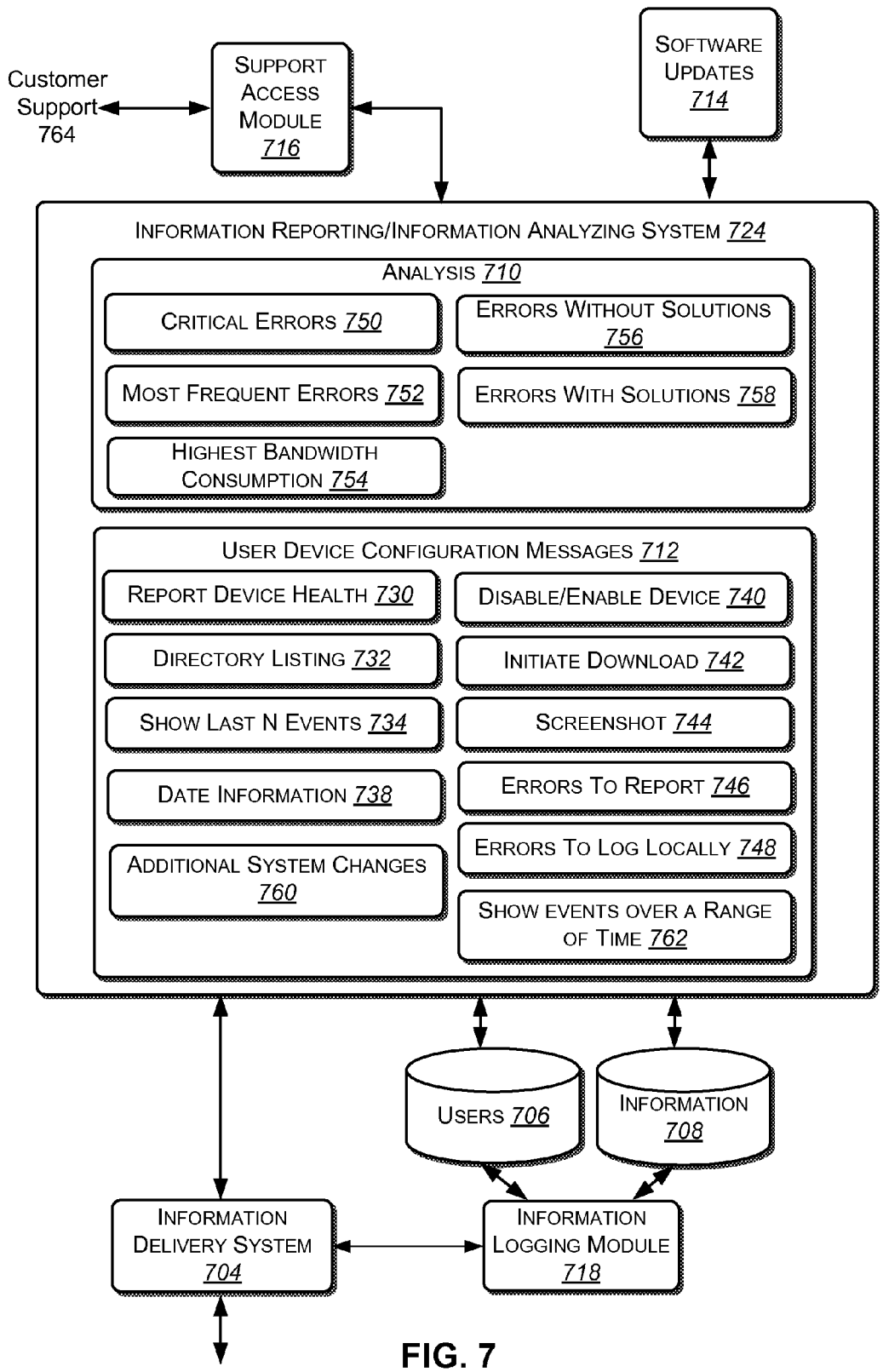
FIG. 7 shows an information reporting/information analyzing system.

FIG. 7 shows an information reporting/information analyzing system 724. The system 724 may include software updates 714 that are necessary for the operation of a user device 104. The information reporting/information analyzing system 724 may send the software updates 714 to the user devices 104. Alternatively, a user device 104 may request software updates 714. Customer support 764 may access the information reporting/information analyzing system 724 by using a support access module 716. Customer support 764 may provide additional analysis or error correction to the information reporting/information analyzing system 724.

The information reporting/information analyzing system 724 may include analysis 710 functionality and user device configuration messages 712. The analysis 710 functionality may allow the information reporting/information analyzing system 724 to analyze user device 104 information, such as errors and events. For example, the analysis 710 functionality may include a list of critical errors 750 that have occurred on a user device 104. The analysis 710 functionality may also include a list of the most frequent errors 752 that have occurred on one or more user devices 104. For example, the analysis 710 functionality may allow the information reporting/information analyzing system 724 to determine which user devices 104 have had the most frequent number of errors reported. Alternatively, the analysis 710 functionality may allow the information reporting/information analyzing system 724 to determine which error has occurred on the highest number of user devices 104.

The analysis 710 functionality may also allow the information reporting/information analyzing system 724 to determine the user devices 104 that have the highest bandwidth consumption 754. The analysis 710 functionality may also allow the information reporting/information analyzing system 724 to create a list of errors without solutions 756 and a list of errors with solutions 758.

The user device configuration messages 712 may include configuration messages/requests to be sent to user devices 104. Many different kinds of requests for information may be sent to the user device 104. The user device configuration messages 712 may include a request to report device health 730 which may be sent to a user device 104 requesting the user device 104 return device health information to the information reporting/information analyzing system 724. A request for directory listing 732 may request a user device 104 to send information indicating the files/filenames located on the user device 104 to the information reporting/information analyzing system 724.

The user device configuration messages 712 may also include a request for a user device 104 to show the last N events 734 with N being an integer. The request to show last N events 734 may ask a user device 104 to prepare and send information concerning the previous N events on the user device 104.

The user device configuration messages 712 may also include a request for a user device 104 to return date information 738 such as the date and times that specific events have occurred on the user device 104.

The user device configuration messages 712 may also include a function to disable/enable 740 a user device 104. A request to initiate download 742 may be used to request that a user device 104 allow the information reporting/information analyzing system 724 to download an error report from the user device 104. Alternatively, the function to initiate download 742 may request that a user device 104 download one or more software updates 714 from the IPS 102.

The user device configuration messages 712 may also include a request for a screenshot 744 from a user device 104. The request for a screenshot 744 may require that the user device 104 prepare and send a screenshot from the user device 104 display to the information reporting/information analyzing system 724.

The user device configuration messages 712 may also include a list of errors to report 746. The list of errors to report 746 may include all errors that have occurred on the device 104, or some subset of the errors that have occurred on the device 104. Likewise, the user device configuration messages 712 may also include a list of errors to log locally 748. The list of errors to log locally 748 may be used to request the device 104 to log certain errors locally to the device 104 but to not yet report these errors to the information reporting/information analyzing system 724.

The user device configuration messages 712 may further include additional system changes 760. The additional system changes 760 may include data and/or actions which provide for the user device 104 to perform self-corrective action. Self-corrective action may include deleting files to free disk space, rebooting the user device 104, fixing corrupt data, deleting corrupt data, altering configuration settings, and other actions that may be performed by the user device 104.

The user device configuration messages 712 may also include a request for a user device 104 to show all the events over a range of time 762. The request to show events over a range of time may ask a user device 104 to prepare and send information concerning the events on the user device 104 that occur during a specific time period. The specific time period may include past time period, present time periods, and future time periods. A request to show events for a future time period may be processed after the time period has expired.

As discussed above in relation to FIG. 6, the system 700 may include one or more databases such as a database of users 706 and an information database 708 that the information reporting/information analyzing system 724 may use. The system 700 may include an information logging module 718. The information logging module 718 may determine which user devices 104 have logged information. The information logging module 718 may then store this information in the databases 706, 708. The system 700 may include an information delivery system 704. The information delivery system 704 may communicate with the user devices 104 through the communication infrastructure 106. The information delivery system 704 may deliver information such as error reports to the information logging module 718. Alternatively, the information delivery system 704 may deliver information directly to the information reporting/information analyzing system 724.

Figure 8:
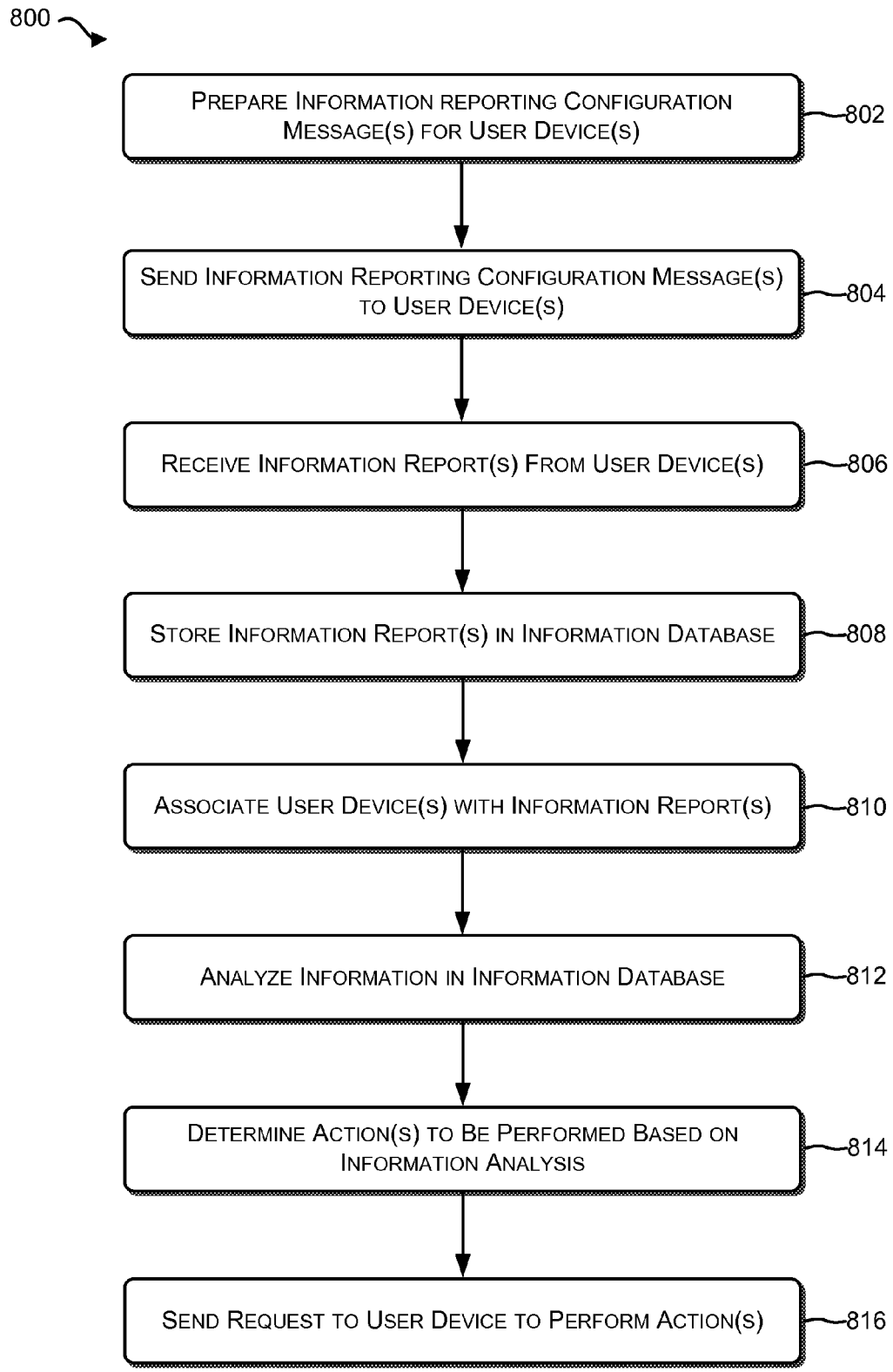
FIG. 8 is a flow diagram that illustrates a method for collecting information from a user device.

FIG. 8 is a flow diagram that illustrates a method 800 for collecting information from a user device 104. The information reporting/information analyzing system 724 may prepare 802 information reporting configuration message(s) for one or more user devices 104. The information reporting/information analyzing system 724 may send 804 the information reporting configuration message(s) to the user device(s) 104. The information reporting/information analyzing system 724 may then receive 806 information report(s) from the user device(s) 104. The information reporting/information analyzing system 724 may store 808 the information report(s) in an information database and associate 810 a user device 104 with the information report. The information in the information database may then be analyzed 812. The system 724 may determine 814 one or more actions to be performed based on the information analysis. Actions may include, but are not limited to, requesting more information from the device, sending a particular software update to the device, sending instructions (e.g., to reset) to the device. The information reporting/information analyzing system 724 may then send 816 a request to the user device 104 to perform the determined actions based on the analysis.

Figure 9:
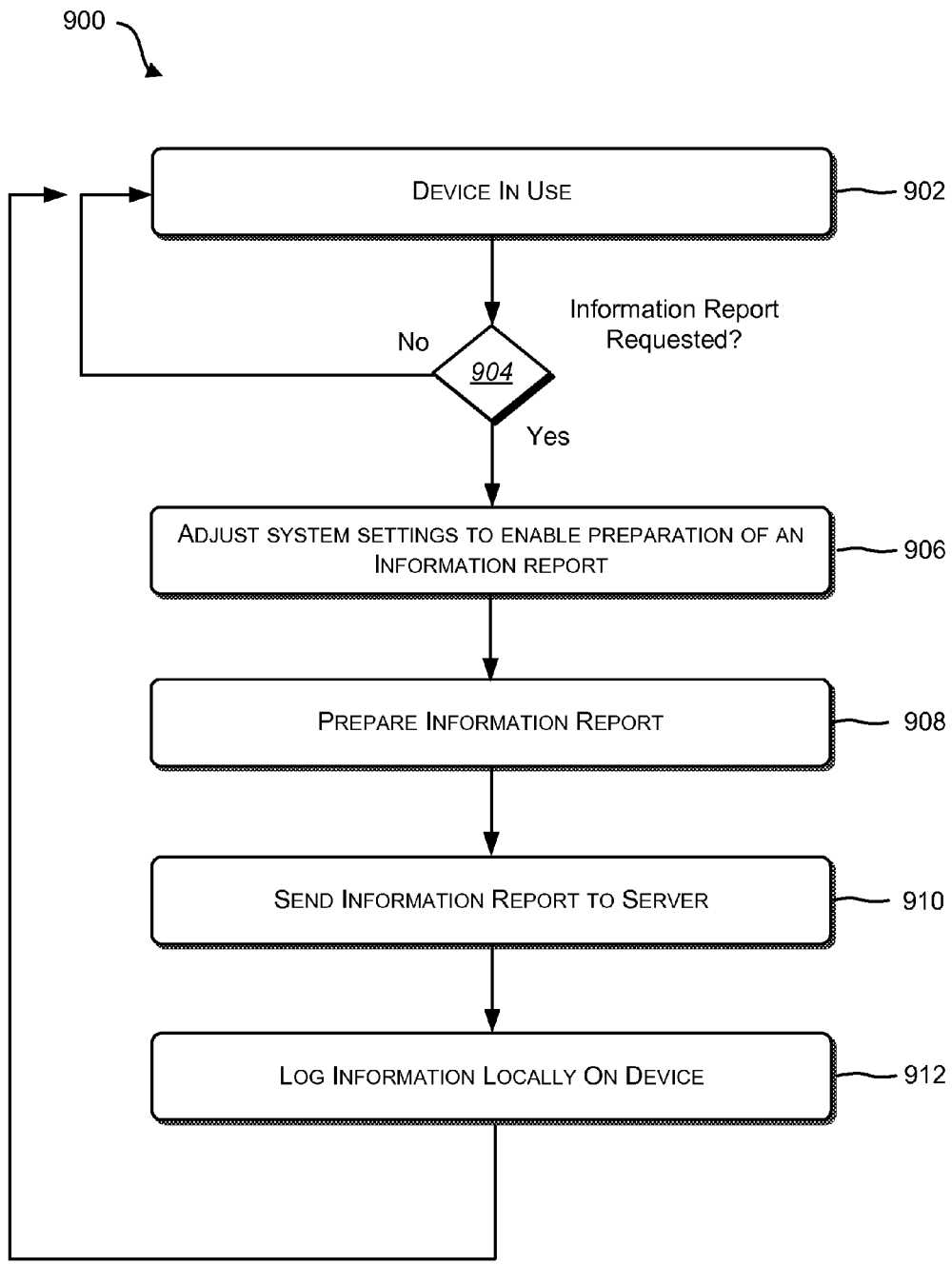
FIG. 9 is a flow diagram that illustrates another method for collecting information from a user device.

FIG. 9 is a flow diagram that illustrates another method 900 for collecting information on a user device 104. The method 900 of FIG. 9 may be implemented on the user device 104. The user device 104 may be in use 902. The user device 104 may receive a request 904 for an information report from a server. If the user device 104 receives a request for an information report, the user device 104 may then adjust 906 system settings to enable preparation of an information report. For example, the user device 104 may close files, flush buffers, or suspend logging so that data can be correctly collected.

The user device 104 may then prepare 908 an information report. The user device 104 may then send 910 the information report to the server. The user device 104 may also log 912 the information locally on the user device 104. Until it is determined 904 that an information report has been requested, the device 104 may continue to operate. This method illustrates information being pulled from the device 104. The device 104 may also be programmed to automatically report specific information to the server at periodic time intervals or upon the occurrence of particular events. For example, the device 104 may be programmed to perform steps 906-912 whenever an event occurs, rather than waiting for an information request. For example, the device 104 may perform steps 906-912 every day at a certain time. The device 104 may be programmed such that steps 906-912 have no customer impact. In other words, the device 104 may prepare and send information reports unbeknownst to the user of the device 104.

Figure 10:
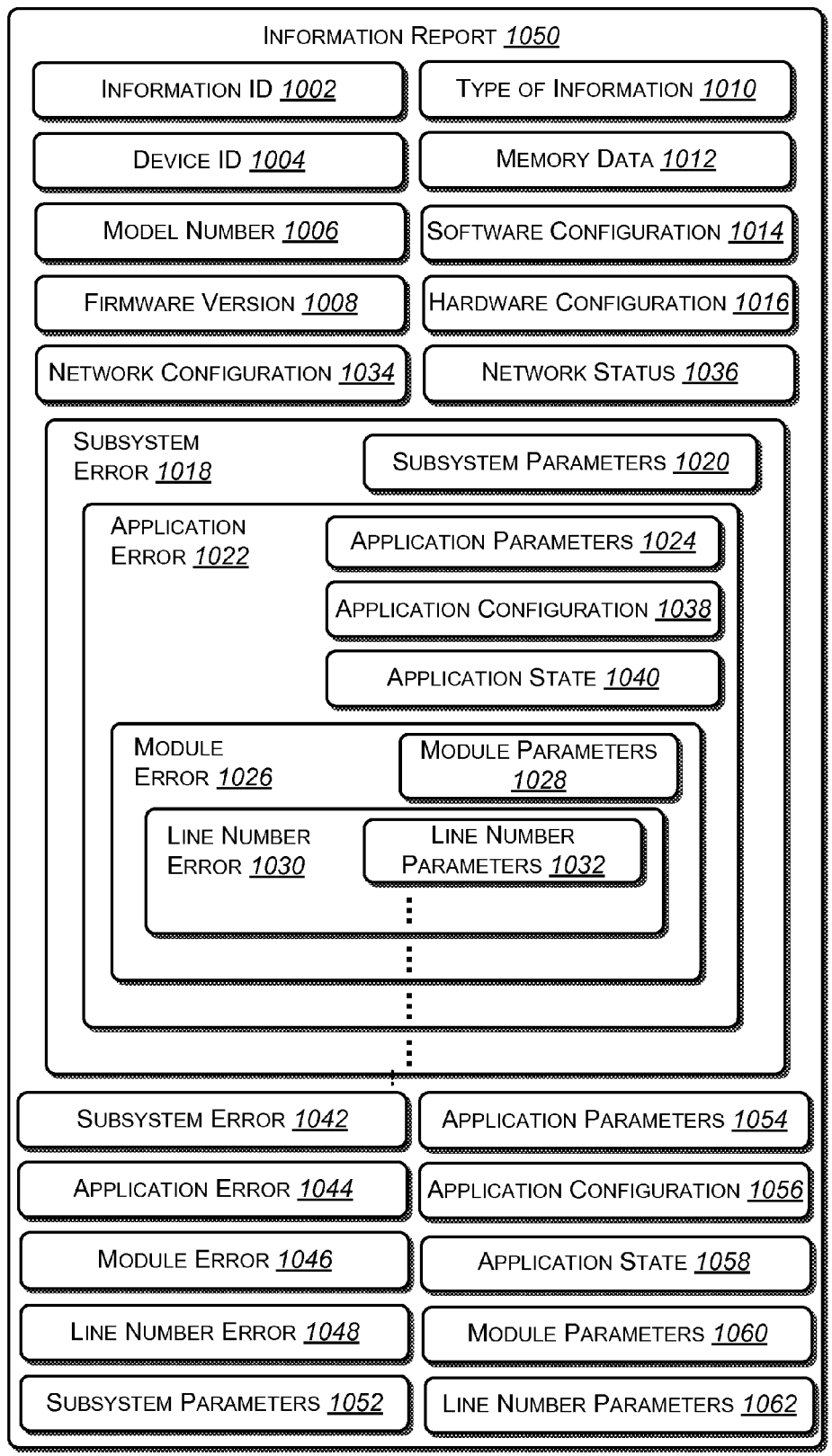
FIG. 10 is a block diagram illustrating one possible implementation of an information report.

FIG. 10 is a block diagram illustrating one possible implementation of an information report 1050. The information report 1050 may include an information ID 1002 that identifies the one or more items of information being reported in the information report 1050. The information report 1050 may include a device ID 1004 that identifies the user device 104 that is providing the information. A model number 1006 of the user device 104 that provided the information, as well as the firmware version 1008, may also be included.

The information report 1050 may include a listing of the type of information 1010 being reported. The type or information 1010 may identify one or more aspects of the information being reported such as a downloading error, a playback error, battery information, usage data, etc. The information report 1050 may include a listing of memory data 1012. The memory data 1012 may include memory related information about the device or about the information being reported. For example, memory data may identify a file that caused an error to be reported, the memory location where an error occurred, a memory dump, etc.

The information report 1050 may also include a listing of the software configuration 1014 and hardware configuration 1016 of the user device 104 (e.g., what software was running, installed, what hardware components are part of the device). The information report 1050 may also include information about the network such as the network connection 1034 and the network status 1036.

The information report 1050 may also include a more detailed description of the information being reported. For example, when reporting a subsystem error 1018, the information report 1050 may include a description of the subsystem error 1018 and a description of the subsystem parameters 1020 before, during, or after the error. Within the subsystem error 1018, the information report 1050 may also include a description of an application error 1022 and a description of the application parameters 1024, application configuration 1038, and application state 1040 before, during, or after the error. The application error 1022 may correspond to an error provided by or associated with a specific application or program on the device. The application state 1040 may be stored in memory or on a disk.

Within the application error 1022, the information report 1050 may also include a description of a module error 1026 and a description of the module parameters 1028 before, during, or after the error. The module error 1026 may correspond to an error provided by or associated with a specific function, procedure or module of an application or program on the device. Within the module error 1026, the information report 1050 may also include a description of a line number error 1030 and a description of the line number parameters 1032 before, during, or after the error.

The information report 1050 may also include separate information for a subsystem error 1042, an application error 1044, a module error 1046, and a line number error 1048. The information report 1050 may further include separate information such as the subsystem parameters 1052, the application parameters 1054, the application configuration 1056, the application state 1058, the module parameters 1060, and the line number parameters 1062. Additional information descriptions that are not shown such as the date and time of the information report 1050 may be included in the information report 1050.

Figure 11:
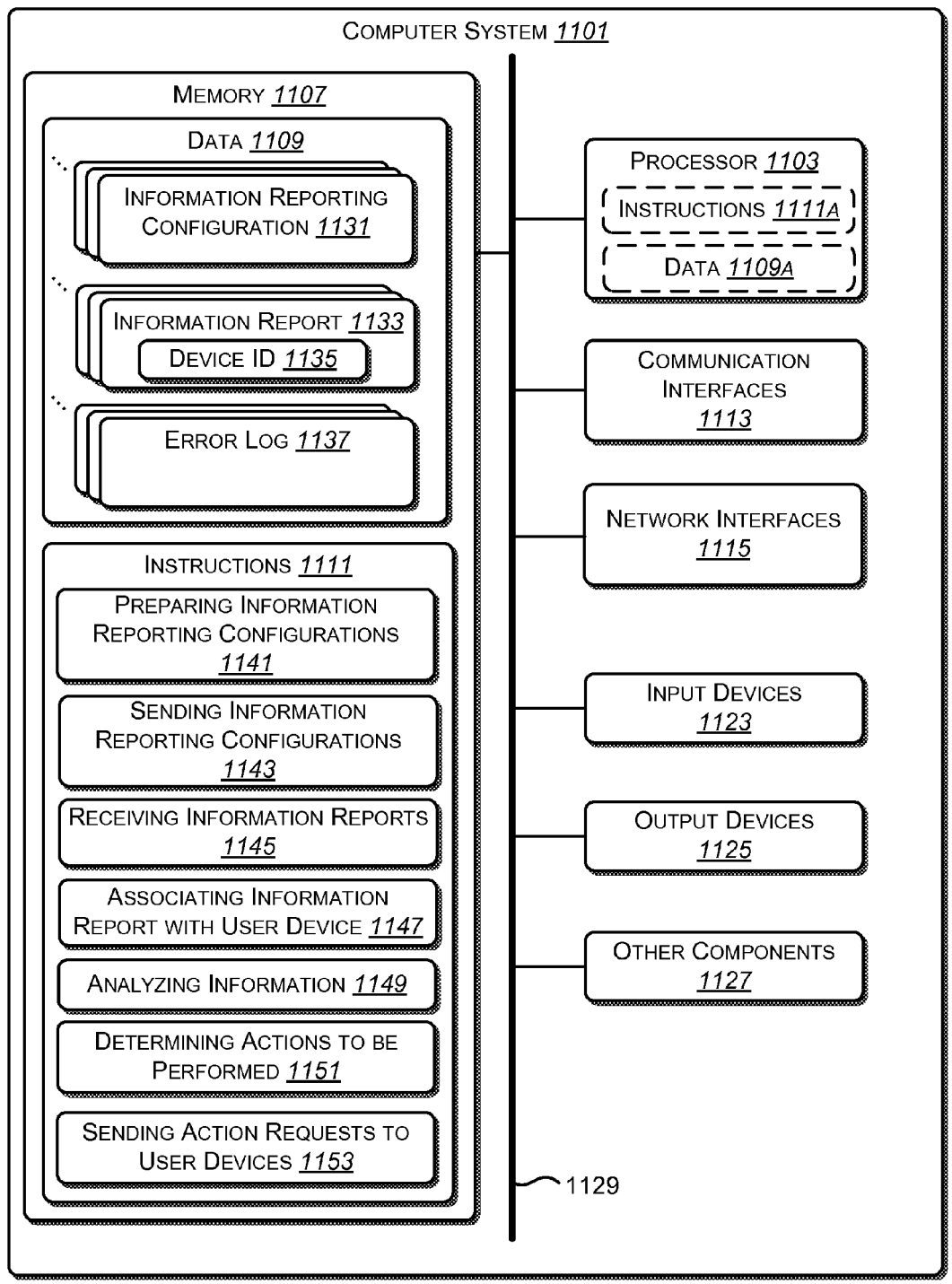
FIG. 11 illustrates various components that may be utilized in a computer system.

FIG. 11 illustrates various components that may be utilized in a computer system 1101. One or more computer systems 1101 may be used to implement the various systems and methods disclosed herein. The illustrated components may be located within the same physical structure or in separate housings or structures. Thus, the term computer or computer system 1101 is used to mean one or more broadly defined computing devices unless it is expressly stated otherwise. Computing devices include the broad range of digital computers including microcontrollers, hand-held computers, personal computers, servers, mainframes, supercomputers, minicomputers, workstations, and any variation or related device thereof.

The computer system 1101 is shown with a processor 1103 and memory 1107. The processor 1103 may control the operation of the computer system 1101 and may be embodied as a microprocessor, a microcontroller, a digital signal processor (DSP) or other device known in the art. The processor 1103 typically performs logical and arithmetic operations based on program instructions 1111 stored within the memory 1107. The instructions 1111 may be executable to implement the methods described herein.

The processor 1103 may also be referred to as a central processing unit (CPU). Memory 1107, which may include both read-only memory (ROM) and random access memory (RAM), provides instructions 1111 and data 1109 to the processor 1103. Portions of the instructions 1111a and the data 1109a are illustrated as being currently executed or read by the processor 1103. A portion of the memory 1107 may also include non-volatile random access memory (NVRAM).

The data 1109 in the memory 1107 may include one or more information reporting configurations 1131. Each information reporting configuration 1131 may pertain to a single item of information or a single user device 104. The data 1109 in the memory 107 may also include one or more information reports 1133 that have been received from one or more user devices 104. An information report 1133 may include the device ID 1135 of the user device 104 that it pertains to. The information report 1133 may include additional information not shown (see FIG. 10). The data 1109 in the memory 1107 may also include one or more error logs 1137 that link user devices 104 to the logged errors.

The instructions 1111 in the memory 1107 may include instructions 1111 for preparing information reporting configurations 1141. The instructions 1111 in the memory 1107 may also include instructions 1111 for sending information reporting configurations 1143 to user devices 104. The instructions 1111 in the memory 1107 may also include instructions 1111 for receiving information reports 1145 from user devices 104. The instructions 1111 in the memory 1107 may also include instructions 1111 for associating information reports 1133 with user devices 1147. The instructions 1111 in the memory 1107 may also include instructions 1111 for analyzing information 1149 in the information reports 1133 received. The instructions 1111 in the memory 1107 may also include instructions 1111 for determining actions to be performed 1151 by the user devices 104. The instructions 1111 in the memory 1107 may also include instructions 1111 for sending action requests to user devices 1153.

FIG. 11 illustrates just one possible example of a computer system 1101 that is configured for error reporting. There are a number of modifications that may be made to the computer system 1101 in accordance with the present disclosure. For example, although just a single processor 1103 is shown in the computer system 1101 of FIG. 11, alternatively a combination of processors 1103 (e.g., an ARM and DSP) could be used. Also, some of the data 1109 and/or the instructions 1111 that are shown in the memory 1107 of the computer system 1101 may be optional and may be omitted. For example, the error logging 1137, the preparing information reporting configurations 1141, and the associating information report with user device 1147 may be optional and may be omitted. Other modifications are also possible in accordance with the present disclosure. Thus, the example shown in FIG. 11 should not be construed as limiting the scope of the present systems and methods.

The computer system 1101 may also include one or more communication interfaces 1113 and/or network interfaces 1115 for communicating with other electronic devices. The communication interface(s) 1113 and the network interface(s) 1115 may be based on wired communication technology, wireless communication technology, or both.

The computer system 1101 may also include one or more input devices 1123 and one or more output devices 1125. The input devices 1123 and output devices 1125 may facilitate user input. Other components 1127 may also be provided as part of the computer system 1101. The various components of the device 1101 may be coupled together by a bus system 1129 which may include a power bus, a control signal bus, and a status signal bus in addition to a data bus. However, for the sake of clarity, the various busses are illustrated in FIG. 11 as the bus system 1129.

FIG. 11 illustrates only one possible configuration of a computer system 1101. Various other architectures and components may be utilized.

Figure 12:
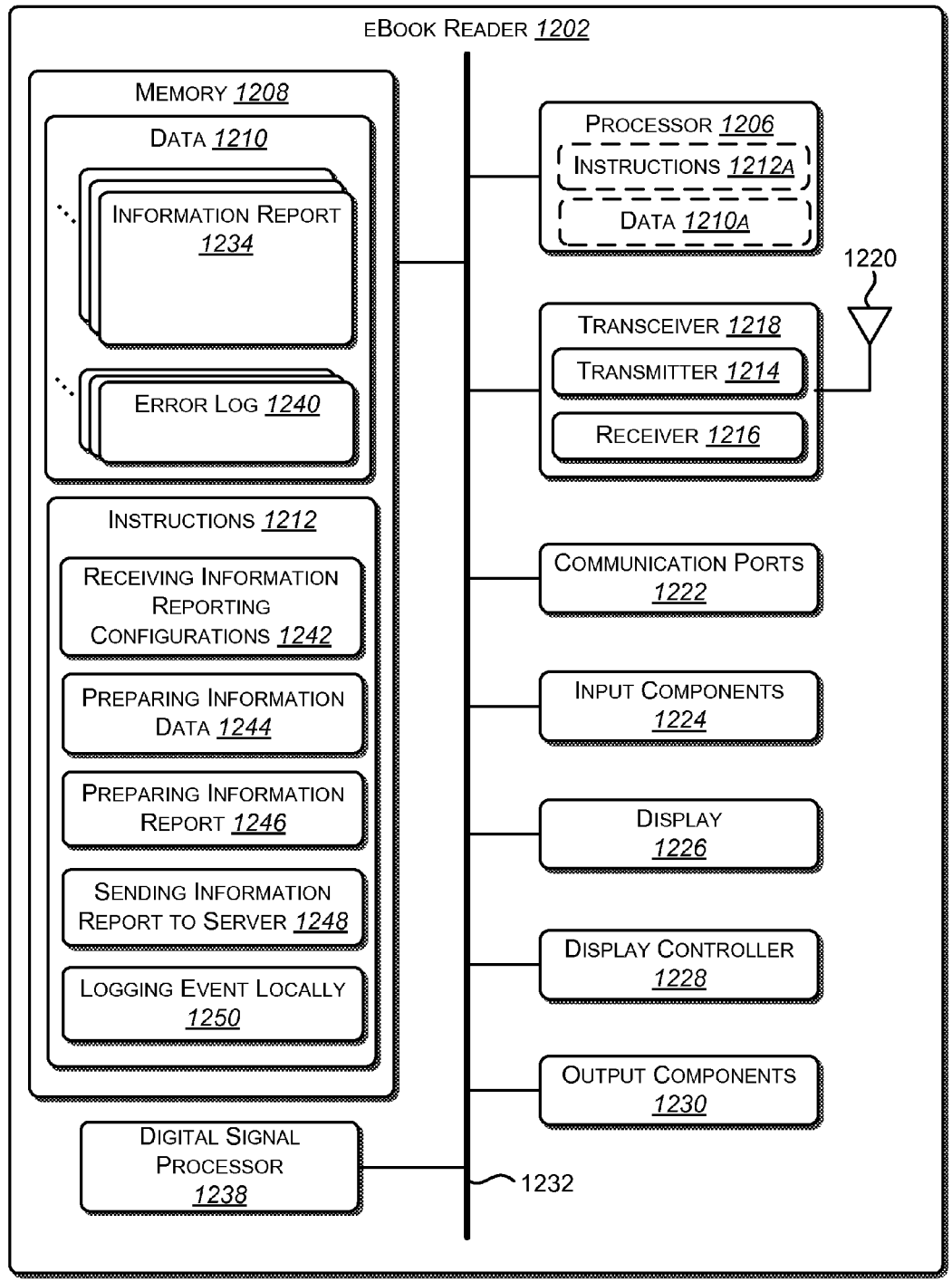
FIG. 12 illustrates various components that may be utilized in one configuration of an eBook reader.

FIG. 12 illustrates various components that may be utilized in one configuration of an eBook reader 1202. The eBook reader 1202 may include a processor 1206 which controls operation of the eBook reader 1202. The processor 1206 may also be referred to as a central processing unit (CPU) and may be embodied as a microprocessor, a microcontroller, a digital signal processor (DSP) or other device known in the art. Portions of the instructions 1212a and the data 1210a are illustrated as being currently executed or read by the processor 1206.

Memory 1208, which may include both read-only memory (ROM) and random access memory (RAM), provides instructions 1212 and data 1210 to the processor 1206. A portion of the memory 1208 may also include non-volatile random access memory (NVRAM). The processor 1206 typically performs logical and arithmetic operations based on program instructions 1212 stored within the memory 1208. The instructions 1212 in the memory 1208 may be executable to implement the methods described herein.

The data 1210 in the memory 1208 may include one or more information reports 1234. Each information report 1234 may include one or more pieces of information data 1236 pertaining to information or events that have occurred on the eBook reader 1202. Information reports 1234 and data 1236 have been discussed in more detail above in relation to FIG. 10. The data 1210 in the memory 1208 may also include one or more error logs 1240 that include error information that has not yet been added to an information report 1234.

The instructions 1212 in the memory 1208 may include instructions 1212 for receiving information reporting configurations 1242, for gathering and preparing data 1244, for preparing information reports 1246, for sending an information report to a server 1248, and for logging an event locally 1250, as has been described above.

The eBook reader 1202 may also include a housing that may include a transmitter 1214 and a receiver 1216 to allow transmission and reception of data between the device 1202 and a remote location. The transmitter 1214 and receiver 1216 may be combined into a transceiver 1218. An antenna 1220 may be attached to the housing and electrically coupled to the transceiver 1218. The eBook reader 1202 may also include (not shown) multiple transmitters, multiple receivers, multiple transceivers and/or multiple antennas.

The eBook reader 1202 may also include a signal detector (not shown) that may be used to detect and quantify the level of signals received by the transceiver 1218. The signal detector may detect such signals as total energy, pilot energy per pseudo noise (PN) chips, power spectral density, and other signals. The eBook reader 1202 may also include a digital signal processor (DSP) 1238 for use in processing signals.

The eBook reader 1202 may also include one or more communication ports 1222. Such communication ports 1222 may allow direct wired connections to be easily made with the device 1202.

Additionally, input components 1224 and output components 1230 may be included with the eBook reader 1202 for various input to and output from the eBook reader 1202. Examples of different kinds of input components 1224 include a keyboard, keypad, mouse, microphone, remote control device, buttons, joystick, trackball, touchpad, light pen, etc. Examples of different kinds of output components 1230 include a speaker, printer, etc. Instead of using the receiver, the eBook reader 1202 may receive action requests such as actions to prepare error reports via the input components 1224. For example, the eBook reader 1202 may receive action requests over a USB port. The eBook reader 1202 may send error reports to a server through the output components instead of the transmitter. For example, the eBook reader 1202 may send error reports to a server over a USB port.

One specific type of output component 1230 is a display 1226. A display controller 1228 may also be provided for converting data 1210 stored in the memory 1208 into text, graphics, and/or moving images (as appropriate) shown on the display 1226.

The display 1226 may be an electronic paper display, which is a display that is capable of holding text and images indefinitely without drawing electricity, while allowing the text and images to be changed later. There are several different technologies that may be used to create an electronic paper display, including electrophoretic display technology, bistable liquid crystal display (LCD) technology, cholesteric LCD display technology, etc. Alternatively, the display 1226 may utilize another image projection technology, such as liquid crystal display (LCD), gas plasma, light-emitting diode (LED), etc.

The various components of the device 1202 may be coupled together by a bus system 1232 which may include a power bus, a control signal bus, and a status signal bus in addition to a data bus. However, for the sake of clarity, the various busses are illustrated in FIG. 12 as the bus system 1232.

Figure 13:
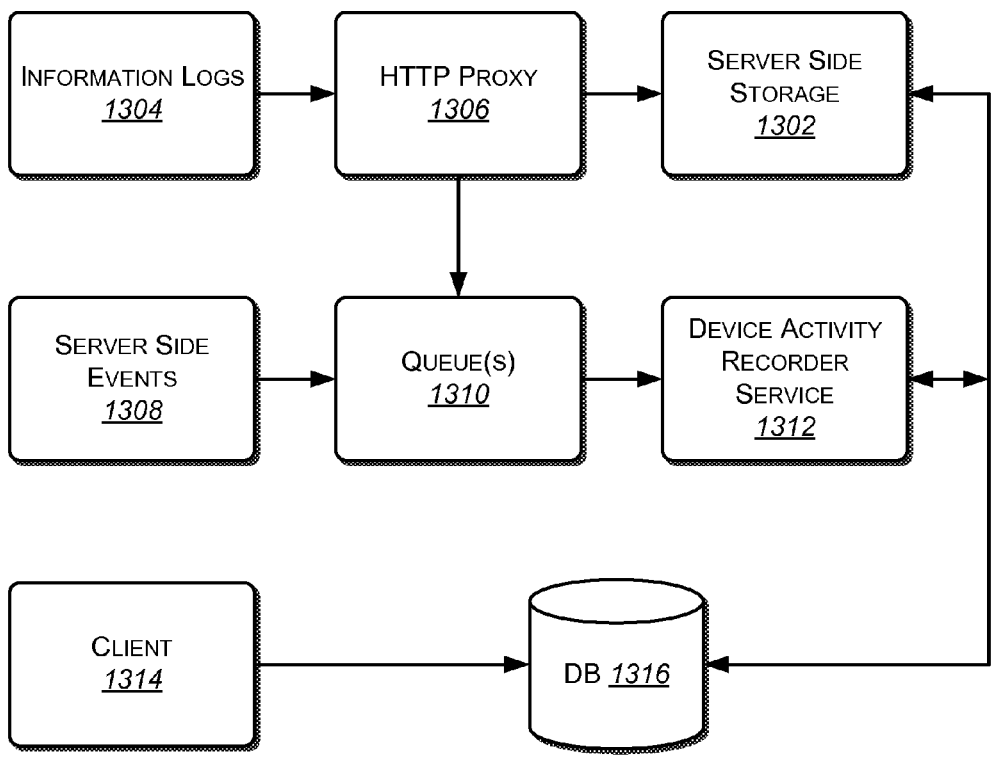
FIG. 13 is a block diagram of a system that requests, receives, and processes information logs.

FIG. 13 is a block diagram of a system that requests, receives, and processes information logs. Information logs 1304 may be periodically pulled from a user device by a server. The server may pull information logs 1304 from a group of user devices. The information logs 1304 may be pulled from a user device by the server using an HTTP proxy 1306. The information logs 1304 may be permanently or temporarily stored on a server-side storage 1302. For example, the server-side storage 1302 may store a backup of error logs that can be accessed in the future. The information logs 1304 may be placed on one or more queues 1310.

Server-side events 1308 may also be placed on the queue 1310. Server-side events 1308 may include notifications sent to a device to perform certain activities, items downloaded, server-side errors, etc. A device activity recorder service 1312 may receive notifications of the information logs 1304 and server-side events 1308 from the queue 1310. For example, the device activity recorder service 1312 may pull notifications of the information logs 1304 and server-side events 1308 from the queue 1310. The device activity recorder service 1312 may process the information logs 1304 and server-side events 1308. The device activity recorder service 1312 may process the information logs 1304 by retrieving the information log files 1304 from the server-side storage 1302, parsing the information log files 1304, and writing each event to a database 1316. The device activity recorder service 1312 may also process the server-side events 1308. The device activity recorder service 1312 may take other actions for event analysis if necessary.

Device events may be queried by a client 1314. A client 1314 may include a process or device that is interested in the event data stored on the database 1316. For example, a client 1314 may include an external request for reports concerning the event data stored on the database 1316. A client 1314 may also include external monitoring of the event data stored on the database 1316. It may be beneficial to interleave server-side events 1308 and device side events. For example, time stamps of events may be used in order to interleave client-side reports and server-side reports to form a timeline of events. In other words, a client 1314 may be able to view the correlation between server-side events 1308 and device-side events.

Other tools and reports may be run off of the database 1316. In one configuration, only the data from the previous month may be queried by the database 1316. The data may be stored long term in a central data repository where browse, sales, fulfillment and replenishment information is consolidated for all legal entities.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for collecting information from an electronic book reader, the method comprising:
sending a configuration message to the electronic book reader, the configuration message for configuring the electronic book reader such that the electronic book reader performs at least one of closing files on the electronic book reader, flushing buffers of the electronic book reader, or suspending logging on the electronic book reader to enable preparation of an error report;
receiving the error report from the electronic book reader, the error report including error information associated with the electronic book reader;
storing the error report in an information database;
analyzing the error information of the error report;
determining at least one action to be performed by an electronic book reader based at least in part on the analyzing of the error information of the error report; and
sending instructions to the electronic book reader to perform the at least one action.

2. The method of claim 1, wherein the at least one action is a self-corrective action.

3. The method of claim 1, wherein the receiving includes receiving the error report at a server.

4. The method of claim 1, further comprising placing the error report on a messaging platform queue.

5. A server that is configured to collect information from user devices, the server comprising:
a processor;
memory in electronic communication with the processor;
instructions stored in the memory, the instructions being executable to:
receive an information report from at least one user device;
store the information report in an information database;
analyze the information report;
determine a self-corrective action to be performed by the at least one user device based at least in part on the analyzing of the information report; and
send an instruction to the at least one user device to perform the self-corrective action, the self-corrective action including at least one of deleting one or more files from the at least one user device, rebooting the at least one user device, fixing corrupt data on the at least one user device, deleting corrupt data on the at least one user device, or altering configuration settings of the at least one user device.

6. The server of claim 5, wherein the at least one user device is an electronic book reader.

7. The server of claim 5, wherein receiving the information report comprises obtaining the information report from the at least one user device through an HTTP proxy.

8. The server of claim 5, wherein the instructions are further executable to place the information report on a messaging platform queue.

9. The server of claim 5, wherein the instructions are further executable to place server-side events on a messaging platform queue.

10. The server of claim 5, wherein the information database comprises server-side storage.

11. The server of claim 5, wherein the instructions are further executable to retrieve the information report from the information database, parse the information report, and write the parsed information report to a short-term database.

12. The server of claim 5, wherein the information report comprises data associated with an error that has occurred on the at least one user device.

13. The server of claim 5, wherein the instructions are further executable to send a configuration message to the at least one user device, wherein the configuration message configures the at least one user device to report information regarding the at least one user device.

14. The server of claim 13, wherein the configuration message configures the at least one user device to collect error information.

15. The server of claim 13, wherein the configuration message configures the at least one user device to produce the information report.

16. The server of claim 13, wherein the configuration message configures the at least one user device to send the information report to the server.

17. An electronic book reader that is configured to provide information, comprising:
   a processor;
   memory in electronic communication with the processor;
   instructions stored in the memory, the instructions executable to:
      prepare a report that includes data relating to an event occurring on the electronic book reader;
      send the report to a server;
      store a record of the event on the electronic book reader; and
      receive one or more instructions from the server that instruct the electronic book reader to perform at least one of deleting one or more files on the electronic book reader, rebooting the electronic book reader, fixing corrupt data on the electronic book reader, deleting corrupt data on the electronic book reader, or altering configuration settings of the electronic book reader.

18. The electronic book reader of claim 17, wherein the instructions are further executable to receive the one or more instructions from the server at least partly in response to sending the report to the server.

19. The electronic book reader of claim 18, wherein the action is a self-corrective action.

20. The electronic book reader of claim 17, wherein the instructions are also executable to receive a configuration message from the server, wherein the configuration message configures the electronic book reader to report information regarding the electronic book reader.

* * * * *